United States Patent
Rinaldi et al.

(10) Patent No.: US 11,305,351 B2
(45) Date of Patent: Apr. 19, 2022

(54) MAGNETIC NANOPARTICLES AND METHODS OF MAKING MAGNETIC NANOPARTICLES

(71) Applicant: University of Florida Research Foundation, Inc., Gainesville, FL (US)

(72) Inventors: Carlos Rinaldi, Gainesville, FL (US); Mythreyi Unni, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 577 days.

(21) Appl. No.: 16/068,979

(22) PCT Filed: Feb. 23, 2017

(86) PCT No.: PCT/US2017/019083
§ 371 (c)(1),
(2) Date: Jul. 10, 2018

(87) PCT Pub. No.: WO2017/147266
PCT Pub. Date: Aug. 31, 2017

(65) Prior Publication Data
US 2019/0022761 A1    Jan. 24, 2019

Related U.S. Application Data

(60) Provisional application No. 62/298,491, filed on Feb. 23, 2016.

(51) Int. Cl.
*B22F 9/30* (2006.01)
*B22F 1/052* (2022.01)
(Continued)

(52) U.S. Cl.
CPC ........... *B22F 9/30* (2013.01); *B22F 1/052* (2022.01); *B22F 1/054* (2022.01); *C01G 49/0036* (2013.01); *C01G 49/0063* (2013.01); *C01G 49/0072* (2013.01); *C01G 49/02* (2013.01); *C01G 51/00* (2013.01); *C01G 53/00* (2013.01); *B82Y 30/00* (2013.01); *C01P 2002/72* (2013.01); *C01P 2004/04* (2013.01); *C01P 2004/64* (2013.01); *C01P 2006/42* (2013.01)

(58) Field of Classification Search
CPC ........... B22F 9/30; B22F 1/0014; B82Y 30/00
See application file for complete search history.

(56) References Cited

U.S. PATENT DOCUMENTS

2004/0247503 A1    12/2004    Hyeon
2006/0088659 A1    4/2006    Bonitatebus, Jr. et al.
(Continued)

OTHER PUBLICATIONS

Roca et al. ("Structural and magnetic properties of uniform magnetite nanoparticles prepared by high temperature decomposition of organic precursors", Nanotechnology 17 (2006) 2783-2788). (Year: 2006).*

(Continued)

*Primary Examiner* — Robert S Jones, Jr.
*Assistant Examiner* — Jiangtian Xu
(74) *Attorney, Agent, or Firm* — Thomas|Horstemeyer, LLP

(57) ABSTRACT

The present disclosure provides for compositions of magnetic nanoparticles and methods of making magnetic nanoparticles with large magnetic diameters.

18 Claims, 10 Drawing Sheets

(51) Int. Cl.

| | |
|---|---|
| B22F 1/054 | (2022.01) |
| C01G 49/00 | (2006.01) |
| C01G 49/02 | (2006.01) |
| C01G 51/00 | (2006.01) |
| C01G 53/00 | (2006.01) |
| B82Y 30/00 | (2011.01) |

(56) References Cited

U.S. PATENT DOCUMENTS

| | | | |
|---|---|---|---|
| 2007/0264199 A1* | 11/2007 | Labhasetwar | A61K 49/1839 424/9.32 |
| 2010/0012880 A1 | 1/2010 | Rampersaud et al. | |
| 2010/0040555 A1 | 2/2010 | Levy et al. | |
| 2015/0053886 A1 | 2/2015 | Gray et al. | |
| 2015/0221425 A1 | 8/2015 | Gangopadhyay et al. | |

OTHER PUBLICATIONS

Krishnan etal (J Magn Magn Mater. Jul. 2009 ; 321(13): 1947-1950. doi: 10.1016 /j.jmmm.2008.12.017). (Year: 2009).*

Tiwary et al (2013 J. Phys. D: Appl. Phys. 46 385001). (Year: 2013).*

Ferguson et al ("Magnetic Particle Imaging With Tailored Iron Oxide Nanoparticle Tracers", IEEE Transactions on Medical Imaging, vol. 34, No. 5, May 2015) (Year: 2015).*

Chen et al. ("Maximizing Hysteretic Losses in Magnetic Ferrite Nanoparticles via Model-Driven Synthesis and Materials Optimization", ACS NANO, vol. 7, No. 10, 8990-9000, 2013) (Year: 2013).*

Georgescu et al. ("Short-range magnetic order in two-dimensional cobalt-ferrite nanoparticle assemblies", Physical Review B 77, 024423, 2008). (Year: 2008).*

Foca-nici et al ("Oleate Coated Magnetic Cores Based on Magnetite, Zn Ferrite and Co Ferrite Nanoparticles—Preparation, Physical Characterization and Biological Impacton Helianthus Annuus Photosynthesis", AIP Conference Proceedings 1311, 425, 2010). (Year: 2010).*

Ararni, H.; Khandhar, A P.; Tomitaka, A; Yu, E.; Goodwill, P. W.; Conolly, S.M.; Krishnan, K. M., In vivo multimodal magnetic particle imaging (MPI) with tailored magneto/optical contrast agents. Biomaterials 2015,52, 251-261.

Baaziz, W.; Pichon, B. P.; Fleutot, S.; Liu, Y.; Lefevre, C.; Greneche, J.-M.; Toumi, M.; Mhiri, T.; Begin-Colin, S., Magnetic Iron Oxide Nanoparticles: Reproducible Tuning of the Size and Nanosized-Dependent Composition, Defects, and Spin Canting. Journal of Physical Chemistry C 2014,118 (7), 3795-3810.

Barrera, C.; Herrera, A P.; Rinaldi, C., Colloidal dispersions ofmonodisperse magnetite nanoparticles modified with poly ethylene glycol). Journal of Colloid and Interface Science 2009, 329 (1), 107-113.

Bauer, L. M.; Situ, S. F.; Griswold, M. A; Sarnia, A C. S., Magnetic Particle Imaging Tracers: State-of-the-Art and Future Directions. Journal of Physical Chemistry Letters 2015, 6 (13), 2509-2517.

Biederer, S.; Knopp, T.; Sattel, T. F.; Ludtke-Buzug, K.; Gleich, B.; Weizenecker, J.; Borgert, J.; Buzug, T. M., Magnetization response spectroscopy of superparamagnetic nanoparticles for magnetic particle imaging. Journal of Physics D-Applied Physics 2009, 42 (20), pp. 1-7.

Birks, J. B., The Properties of Ferromagnetic Compounds at Centimetre Wavelengths. Proceedings of the Physical Society of London Section B 1950, 63 (362), 65-74.

Casula, M. F.; Jun, Y. W.; Zaziski, D. J.; Chan, E. M.; Corrias, A; Alivisatos, A P., The concept of delayed nucleation in nanocrystal growth demonstrated for the case of iron oxide nanodisks. Journal of the American Chemical Society 2006, 128 (5), 1675-1682.

Chantrell, R. W.; Popplewell, J.; Charles, S. W., Measurements of Particle-Size Distribution Parameters in Ferro Fluids, Ieee Transactions on Magnetics 1978, 14 (5), 975-977.

Chen, D. X.; Sanchez, A; Taboada, E.; Roig, A; Sun, N.; Gu, H. C., Size determination of superparamagnetic nanoparticles from magnetization curve Journal of Applied Physics 2009, 105 (8), pp. 1-6.

Chen, R.; Christiansen, M. G.; Anikeeva, P., Maximizing Hysteretic Losses in Magnetic Ferrite Nanoparticles via Model-Driven Synthesis and Materials Optimization. Acs Nano 2013, 7 (10), 8990-9000.

Cornell, R. M.; Schwertmann, U., The iron oxides: structure, properties, reactions, occurrence, and uses. VCH Weinheim; New York, 1996.

Crowl, D. A, Minimize the Risks of Flammable Materials. Chemical Engineering Progress 2012, 108 (4), 28-33.

Dhavalikar, R.; Maldonado-Camargo, L.; Garraud, N.; Rinaldi, C., Ferrohydrodynamic modeling of magnetic anoparticle harmonic spectra for magnetic particle imaging Journal of Applied Physics 2015, 118 (17), pp. 1-8.

Estrader, M.; Lopez-Ortega, A; Golosovsky, I. V.; Estrade, S.; Roca, A G.; Salazar-Alvarez, G.; Lopez-Conesa, L. Tobia, D.; Winkler, E.; Ardisson, J.D.; Macedo, W. A A; Morphis, A; Vasilakaki, M.; Trohidou, K. N.; Gukasov, A; Mirebeau, I.; Makarova, 0. L.; Zysler, R. D.; Peiro, F.; Baro, M.D.; Bergstrom, L.; Nogues, J., Origin of the large dispersion of magnetic properties in nanostructured oxides: FexO/Fe3O4 nanoparticles as a case study. Nanoscale 2015, 7 (7), 3002-3015.

Gleich, B.; Weizenecker, R., Tomographic imaging using the non-linear response of magnetic particles. Nature 2005,435 (7046), 1214-1217.

Gonzales-Weimuller, M.; Zeisberger, M.; Krishnan, K. M., Size-dependant heating rates of iron oxide nanoparticles for nagnetic fluid hyperthermia. Journal of Magnetism and Magnetic Materials 2009,321 (13), 1947-1950.

Goodwill, P. W.; Conolly, S.M., The X-Space Formulation of the Magnetic Particle Imaging Process: 1-D Signal, Resolution, Bandwidth, SNR, SAR, and Magnetostimulation, Ieee Transactions on Medical Imaging 2010, 29 (11), 1851-1859.

Goodwill, P. W.; Saritas, E. U.; Croft, L. R.; Kim, T. N.; Krishnan, K. M.; Schaffer, D. V.; Conolly, S.M., X-Space MPI: Magnetic Nanoparticles for Safe Medical Imaging. Advanced Materials 2012, 24 (28), 3870-3877.

Goodwill, P. W.; Tamrazian, A; Croft, L. R.; Lu, C. D.; Johnson, E. M.; Pidaparthi, R.; Ferguson, R. M.; Khandhar, A P.; Krishnan, K. M.; Conolly, S.M., Ferrohydrodynamic relaxometry for magnetic particle imaging. Applied Physics Letters 2011, 98 (26), pp. 1-3.

Hufschmid, R.; Arami, H.; Ferguson, R. M.; Gonzales, M.; Teeman, E.; Brush, L. N.; Browning, N.D.; Krishnan, K. M., Synthesis of phase-pure and monodisperse iron oxide nanoparticles by thermal decomposition. Nanoscale 2015, 7, 11142-11154.

Iglesias, 0.; Labarta, A; Batlle, X., Exchange bias phenomenology and models of core/shell nanoparticles. Journal of Nanoscience and Nanotechnology 2008, 8, 2761-2780.

Issa, B.; Obaidat, I. M.; Albiss, B. A; Haik, Y., Magnetic Nanoparticles: Surface Effects and Properties Related to Biomedicine Applications International Journal of Molecular Sciences 2013, 14, 21266-21305.

Jang, S. Y.; You, C. Y.; Lim, S. H.; Lee, S. R., Annealing effects on the magnetic dead layer and saturation magnetization in unit structures relevant to a synthetic ferrimagnetic free structure. Journal of Applied Physics 2011, 109 (1), pp. 1-5.

Kaiser, R.; Miskolcz.G, Magnetic Properties of Stable Dispersions of Subdomain Magnetite Particles. Journal of Applied Physics 1970, 41 (3), 1064-1072.

Kallumadil, M.; Tada, M.; Nakagawa, T.; Abe, M.; Southern, P.; Pankhurst, Q. A, Suitability of commercial colloids for magnetic hyperthermia. Journal of Magnetism and Magnetic Materials 2009, 321 (10), 1509-1513.

Kemp, S. J.; Ferguson, R. M.; Khandhar, A P.; Krishnan, K. M., Monodisperse magnetite nanoparticles with nearly deal saturation magnetization. RSC Advances: 2016; vol. 6, pp. 77452-77464.

Khandhar, A. P.; Ferguson, R. M.; Arami, H.; Kemp, S. J.; Krishnan, K. M., Tuning Surface Coatings of Optimized Magnetite Nanoparticle Tracers for In Vivo Magnetic Particle Imaging, Ieee Transactions on Magnetics 2015, 51 (2), pp. 1-12.

Levy, M.; Quarta, A.; Espinosa, A.; Figuerola, A.; Wilhelm, C.; Garcia-Hernandez, M.; Genovese, A.; Falqui, A. Alloyeau, D.;

(56) References Cited

OTHER PUBLICATIONS

Buonsanti, R.; Davide Cozzoli, P.; Angel Garcia, M.; Gazeau, F.; Pellegrino, T., Correlating Magneto-Structural Properties to Hyperthermia Performance of Highly Monodisperse Iron Oxide Nanoparticles Prepared by a Seeded-Growth Route. Chemistry of Materials 2011, 23 (18), 4170-4180.

Luigjes, B.; Woudenberg, S.M. C.; de Groot, R.; Meeldijk, J.D.; Galvis, H. M. T.; de Jong, K. P.; Philipse, A. P.; Erne, B. H., Diverging Geometric and Magnetic Size Distributions of Iron Oxide Nanocrystals. Journal of Physical Chemistry 3 2011, 115(30), 14598-14605.

Manh-Huong Phan ; Javier Alonso; Khurshid, H.; Lampen-Kelley, P.; Chandra, S.; Repa, K. S.; Nemati, Z.; Das, R; Iglesias, 6.; Srikanth, H., Exchange Bias Effects in Iron Oxide-Based Nanoparticle Systems. Functional Magnetic Nanoparticles in Nanomedicine ): Nanomaterials 2016, 6 (11), 221,1-31.

Merida, F.; Chiu-Lam, A.; Bohorquez, A.; Maldonado-Camargo, L.; Perez, M. E.; Pericchi, L.; Torres-Lugo, M.; Rinaldi, C., Optimization of synthesis and peptization steps to obtain iron oxide nanoparticles with high energy dissipation rates. Journal of Magnetism and Magnetic Materials 2015, 394, 361-371.

Morales, M.P.; Veintemillas-Verdaguer, S.; Montero, M. I.; Serna, C. J.; Roig, A.; Casas, L.; Martinez, B. Sandiumenge, F., Surface and internal spin canting in gamma-Fe2O3 nanoparticles. Chemistry of Materials 1999,11 (11), 3058-3064.

Muscas, G.; Singh, G.; Glomm, W. R.; Mathieu, R.; Kumar, P. A; Concas, G.; Agostinelli, E.; Peddis, D., Tuning the Size and Shape of Oxide N anoparticles by Controlling Oxygen Content in the Reaction Environment: Morphological Analysis by Aspect Maps. Chemistry of Materials 2015, 27 (6), 1982-1990.

Na, H. B.; Song, I. C.; Hyeon, T., Inorganic Nanoparticles for MRI Contrast Agents. Advanced Materials 2009, 21 (21), 2133-2148.

Panagiotopoulos, N.; Duschka, R. L.; Ahlborg, M.; Bringout, G.; Debbeler, C.; Graeser, M.; Kaethner, C.; Ludtke-Buzug, K.; Medimagh, H.; Stelzner, J.; Buzug, T. M.;Barkhausen, J.; Vogt, F. M.; Haegele, J., Magnetic particle imaging: current developments and future directions. International Journal of Nanomedicine 2015, 10, 3097-3114.

Park, J.; An, K. J.; Hwang, Y. S.; Park, J. G.; Noh, H. J.; Kim, J. Y.; Park, J. H.; Hwang, N. M.; Hyeon, T., Ultra-large-scale syntheses of monodisperse nanocrystals. Nature Materials 2004, 3 (12), 891-895.

Parkin, S. S. P.; Sigsbee, R.; Felici, R.; Felcher, G. P., Observation of Magnetic Dead Layers at the Surface of Iron-Oxide Films. Applied Physics Letters 1986, 48 (9), 604-606.

Rasa, M., Magnetic properties and magneto-birefringence of magnetic fluids. European Physical Journal E 2000, 2 (3), 265-275.

Rosensweig, R. E., Heating magnetic fluid with alternating magnetic field. Journal of Magnetism and Magnetic Materials 2002,252 (1-3), 370-374.

Schneider, C. A; Rasband, W. S.; Eliceiri, K. W., Nih Image to ImageJ: 25 years of image analysis. Nature Methods 2012, 9 (7), 671-675.

Torruella, P.; Arenal, R.; de la Pena, F.; Saghi, Z.; Vedra, L.; Eljarrat, A; Lopez-Conesa, L.; Estrader, M.; Lopez-Ortega, A; Salazar-Alvarez, G.; Nogues, J.; Ducati, C.; Midgley, P. A; Peiro, F.; Estrade, S., 3D Visualization of the Iron Oxidation State in FeO/Fe3O4 Core-Shell Nanocubes from Electron Energy Loss Tomography Nano Letters 2016, 16 (8), 5068-5073.

Van Rijssel, J.; Kuipers, B. W. M.; Erne, B. H., Bimodal distribution of the magnetic dipole moment in nanoparticles with a monomodal distribution of the physical size Journal of Magnetism and Magnetic Materials 2015, 380, 325-329.

Vreeland, E. C.; Watt, J.; Schober, G. B.; Hance, B. G.; Austin, M. J.; Price, A D.; Fellows, B. D.; Monson, T. C.; Hudak, N. S.; Maldonado-Camargo, L.; Bohorquez, A C.; Rinaldi, C.; Huber, D. L., Enhanced Nanoparticle Size Control by Extending LaMer's Mechanism. Chemistry of Materials 2015,27 (17), 6059-6066.

Wetterskog, E.; Tai, C. W.; Grins, J.; Bergstrom, L.; Salazar-Alvarez, G., Anomalous Magnetic Properties ofNanoparticles Arising from Defect Structures: Topotaxial Oxidation ofFe1-xO vertical bar Fe3-delta O4 Core vertical bar Shell Nanocubes to Single-Phase Particles. Acs Nano 2013, 7 (8), 7132-7144.

Wildeboer, R. R.; Southern, P.; Pankhurst, Q. A, On the reliable measurement of specific absorption rates and intrinsic loss parameters in magnetic hyperthermia materials. Journal of Physics D-Applied Physics 2014,47 (49), 1-14.

International Search Report and written opinion dated May 10, 2017 for application serial No. PCT/US17/19083, 15 pages.

A. Kraupner et al. Bacterial magnetosomes—nature's powerful contribution to MPI tracer research; Nanoscale, 2017, 9.

* cited by examiner

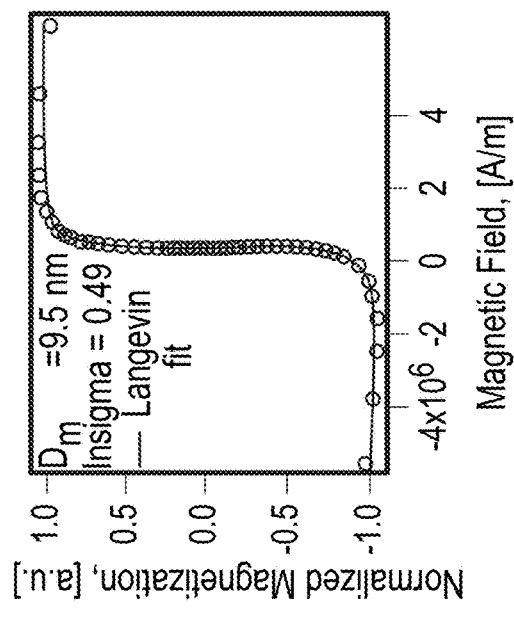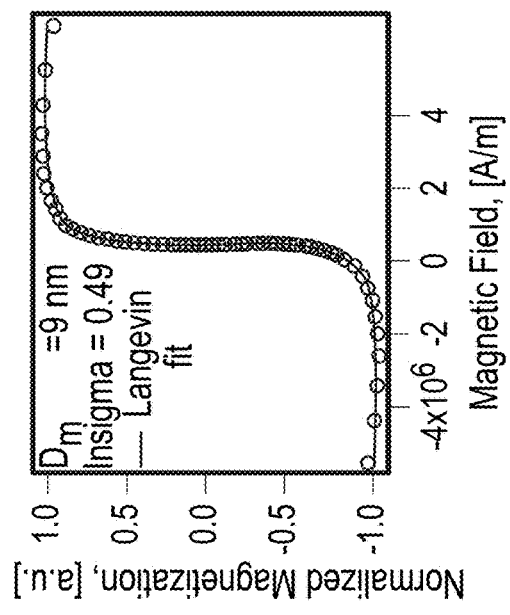
Fig. 1.1A
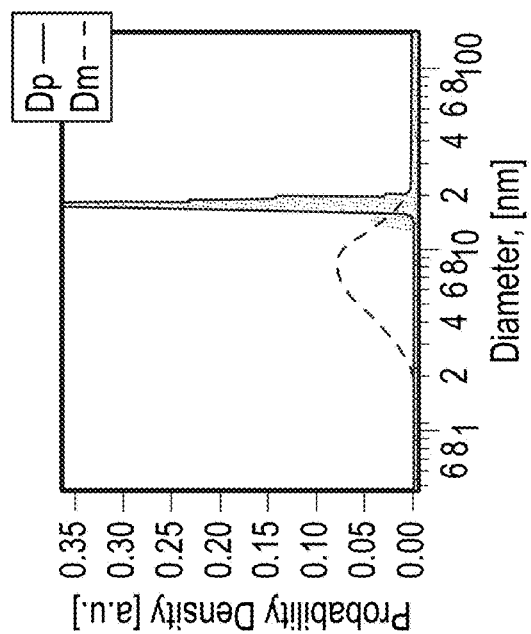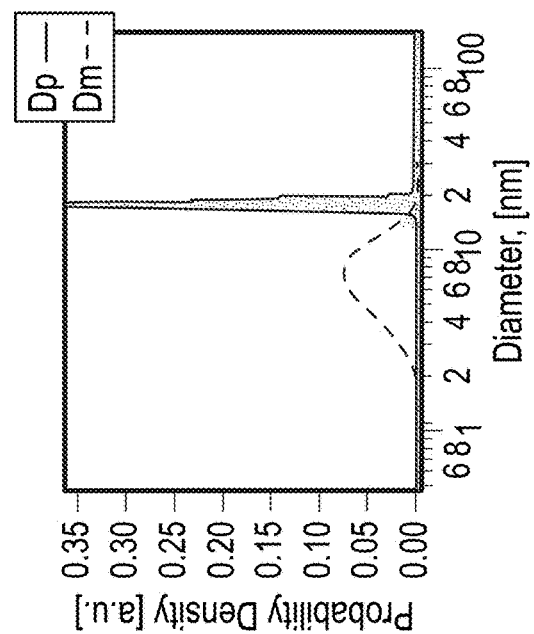
Fig. 1.1B

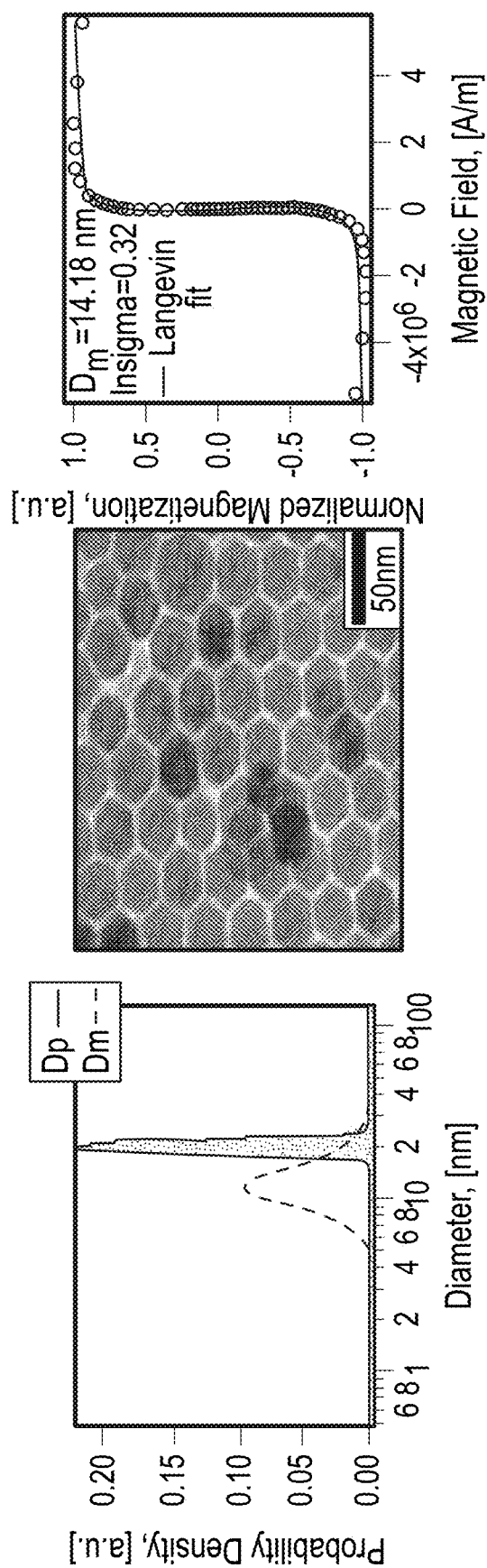
FIG. 1.1C

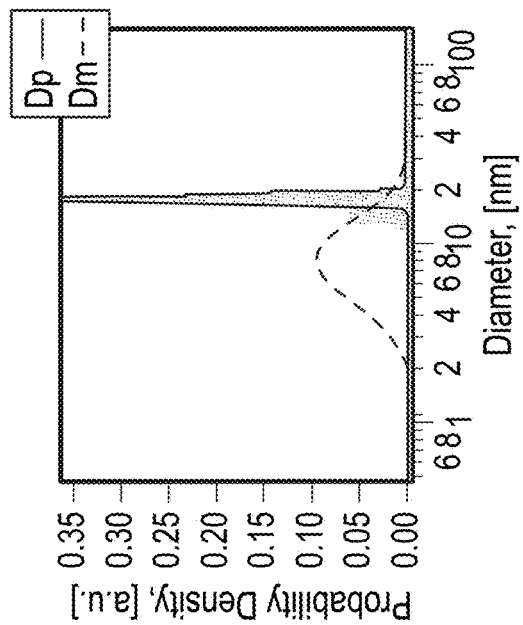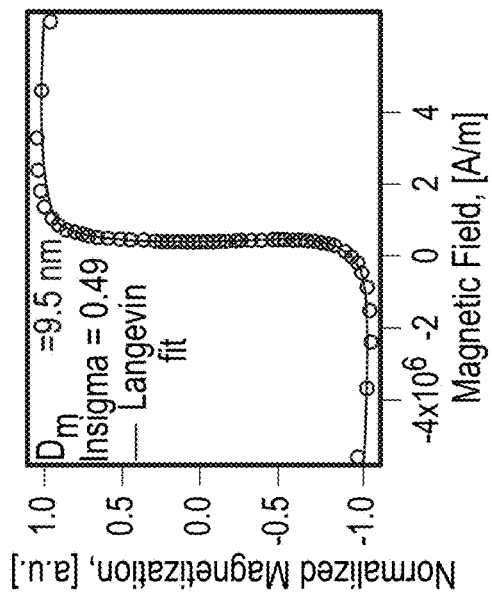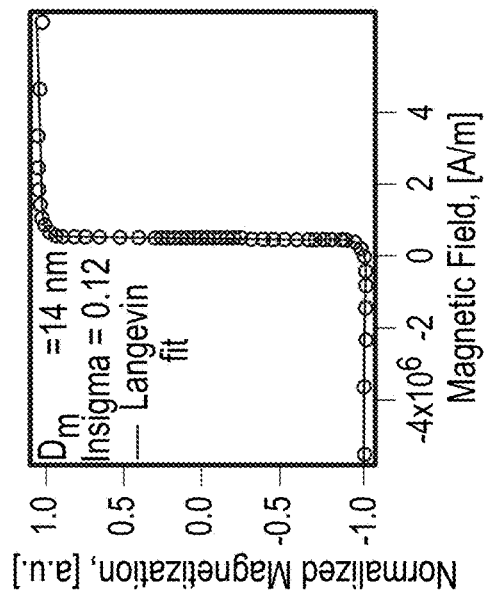
Fig. 1.2A
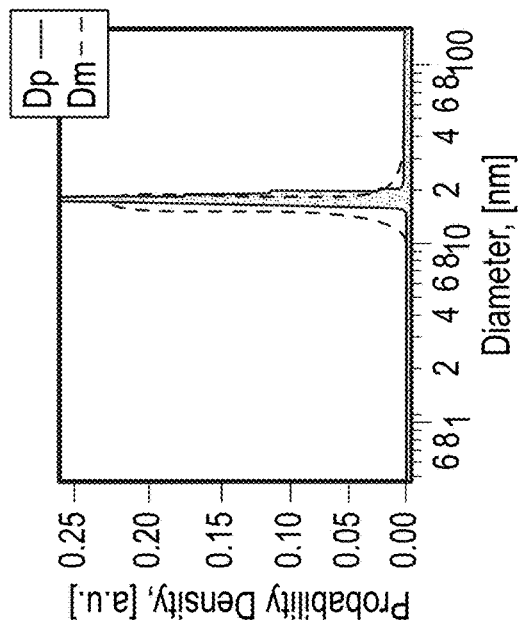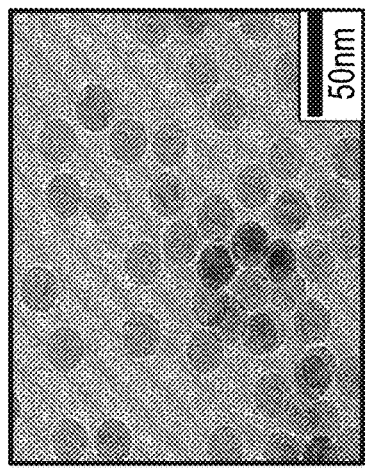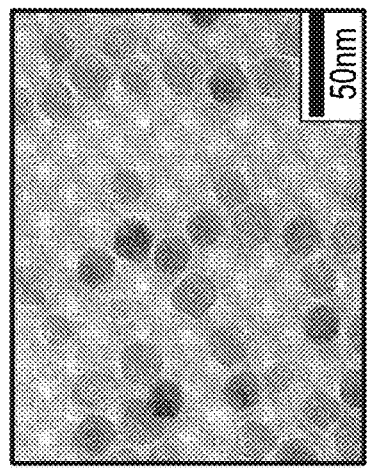
Fig. 1.2B

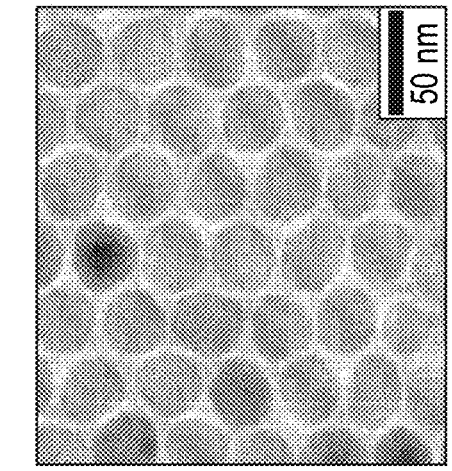
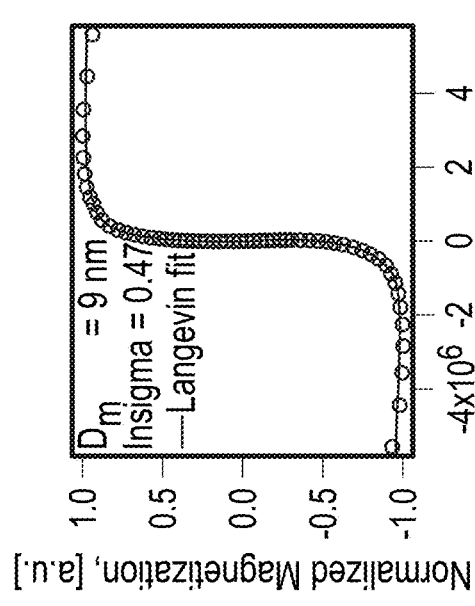
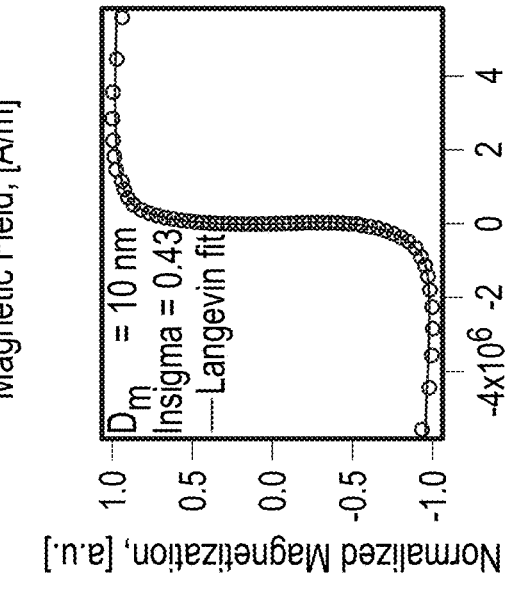
FIG. 1.3A
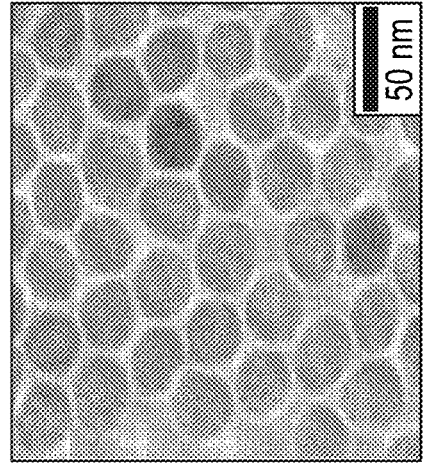
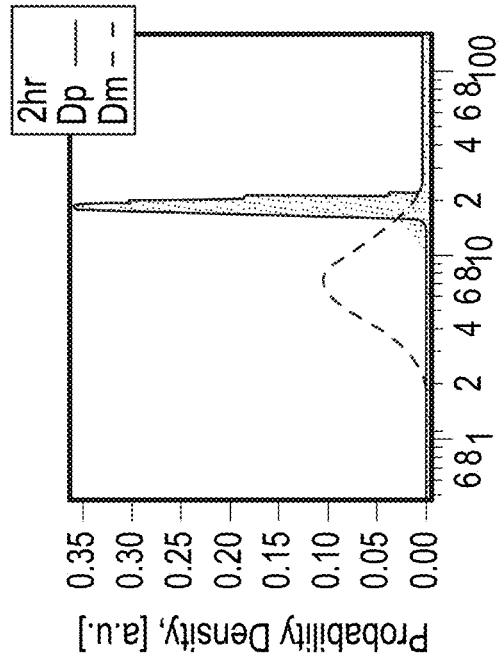
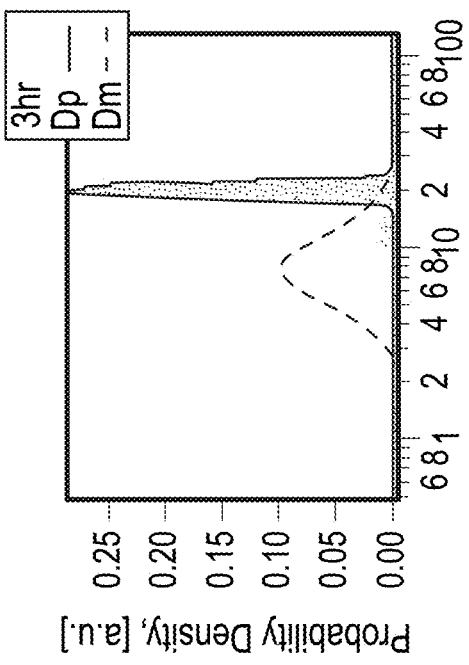
FIG. 1.3B

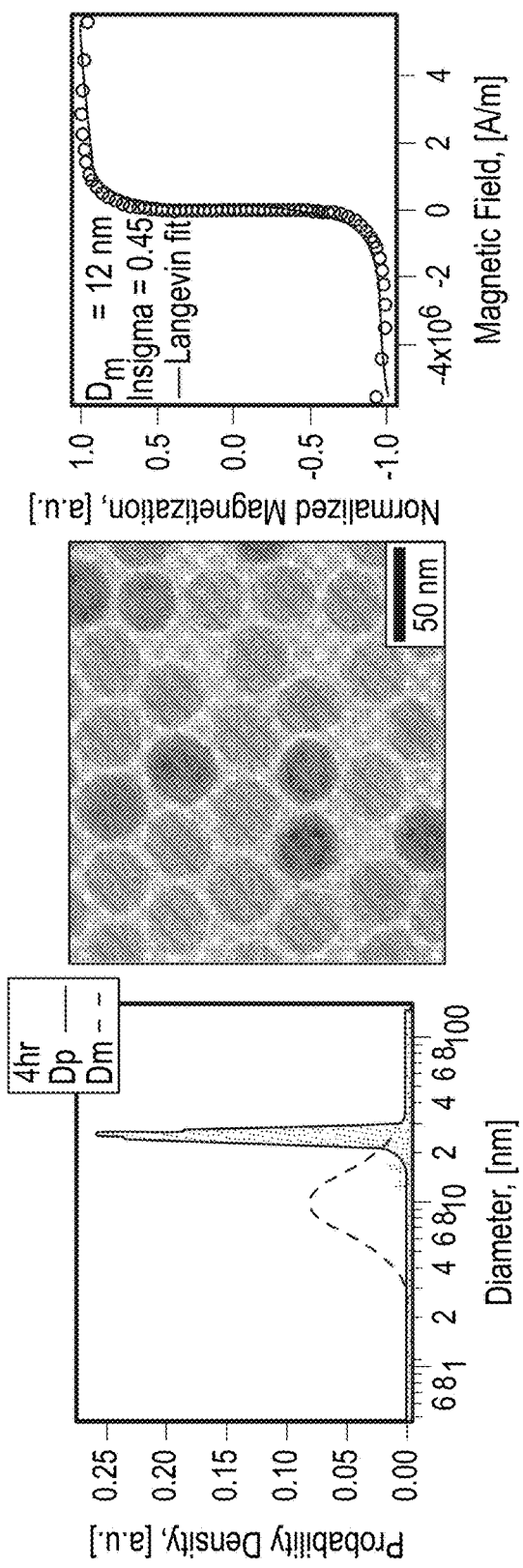
FIG. 1.3C
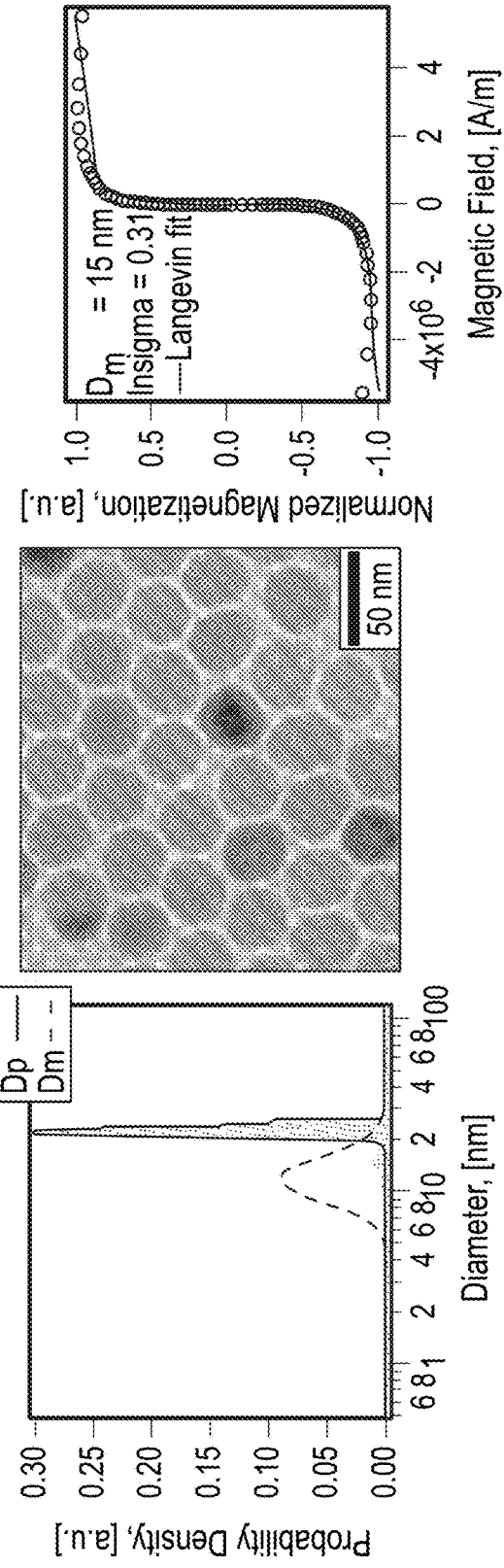
FIG. 1.3D

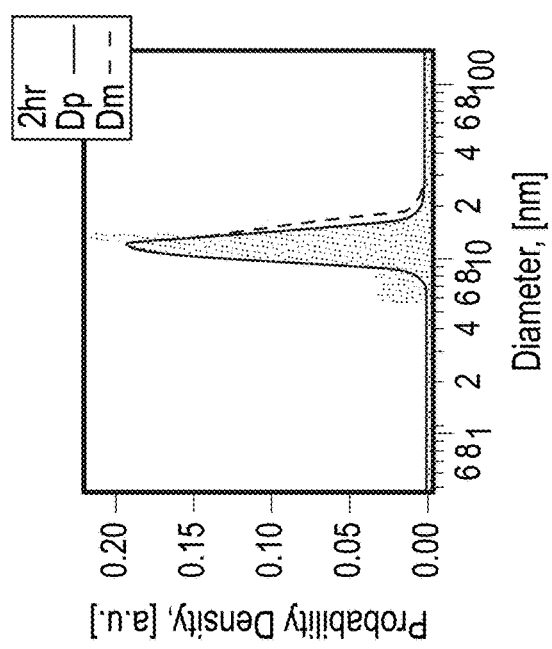 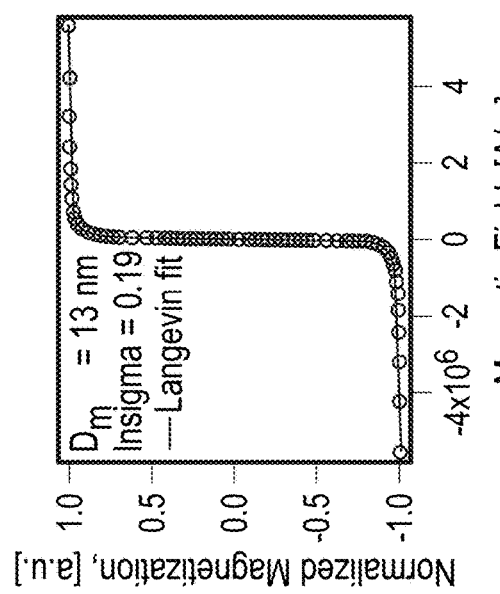 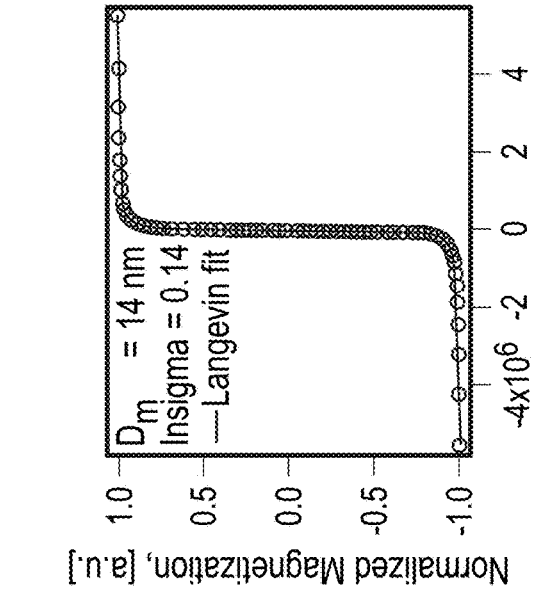
FIG. 1.4A
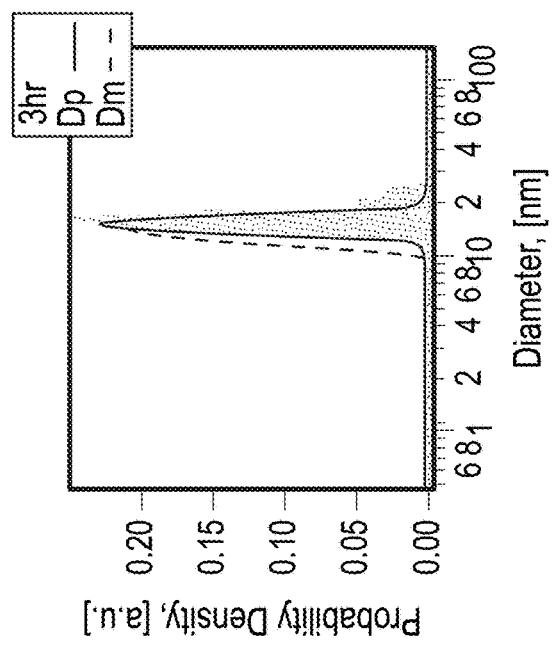 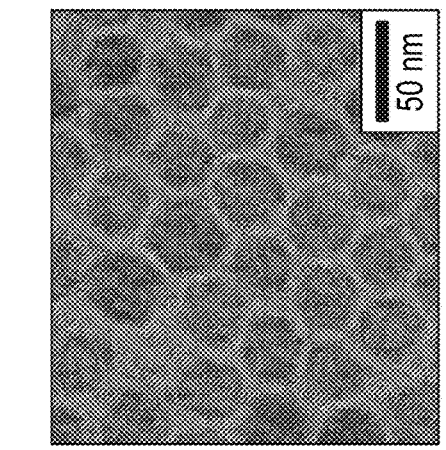 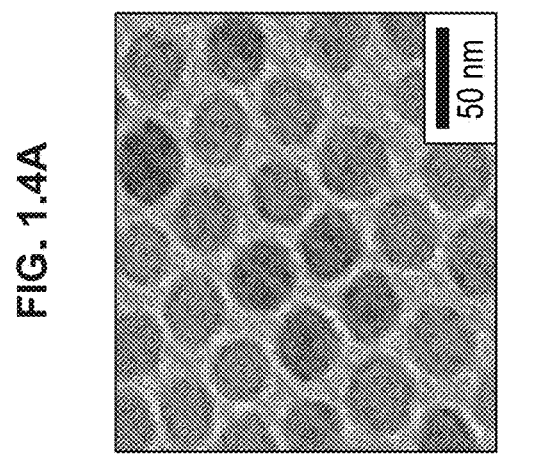
FIG. 1.4B

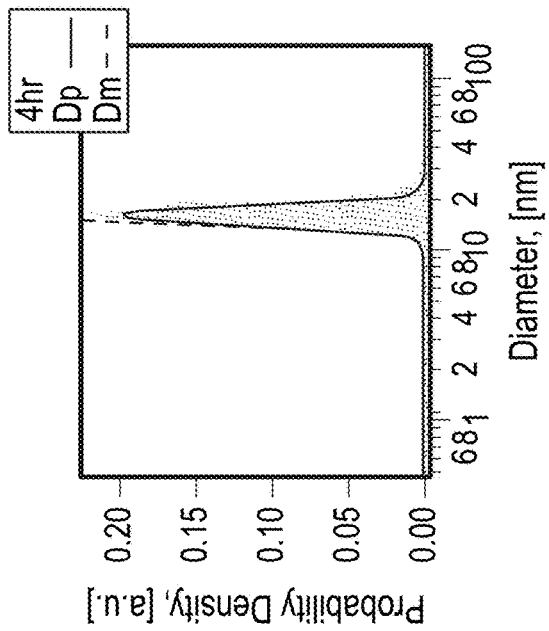
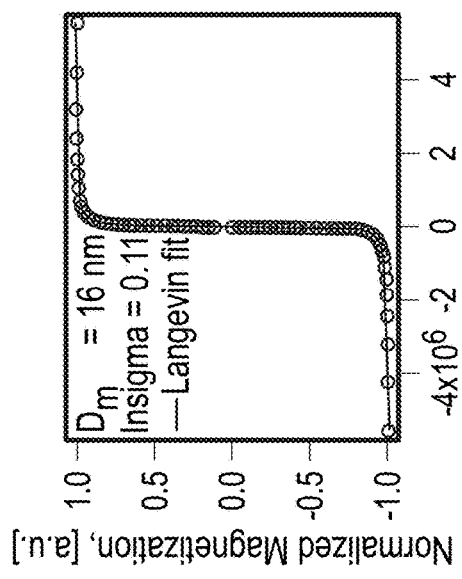
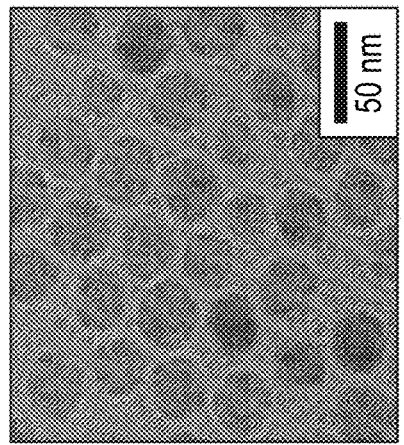
FIG. 1.4C
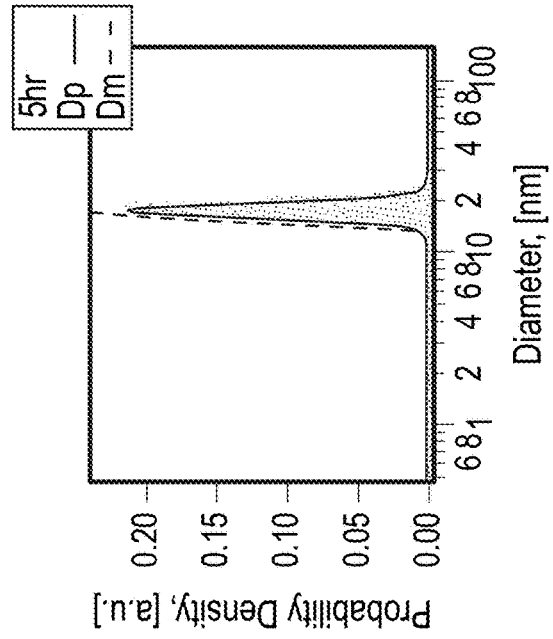
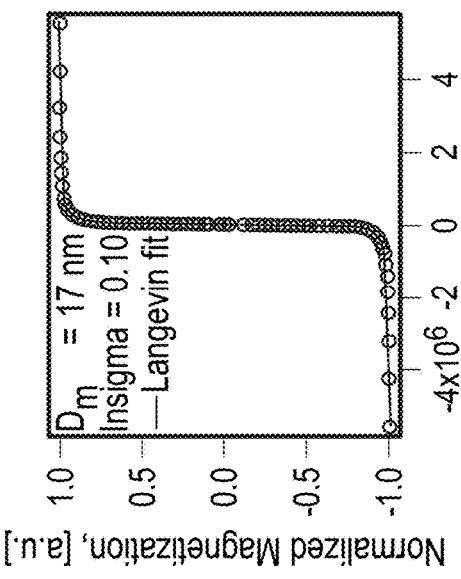
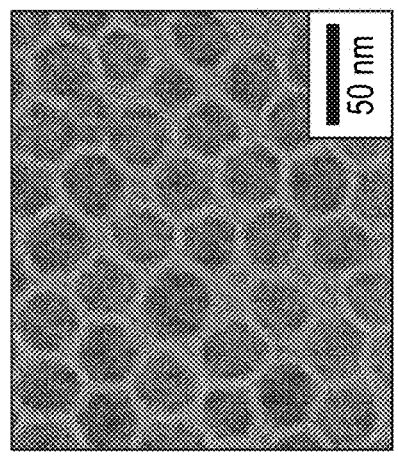
FIG. 1.4D

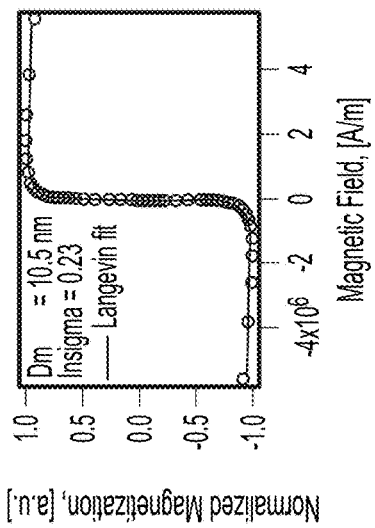
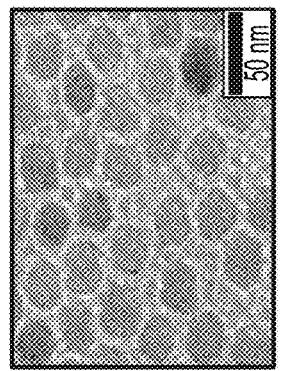
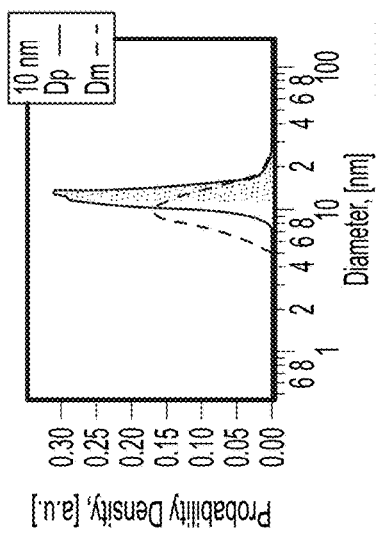
FIG. 1.9A
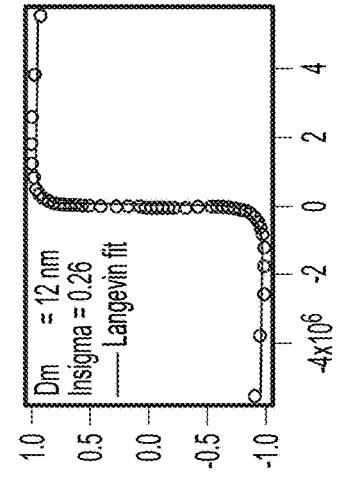
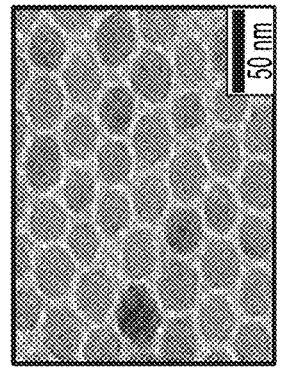
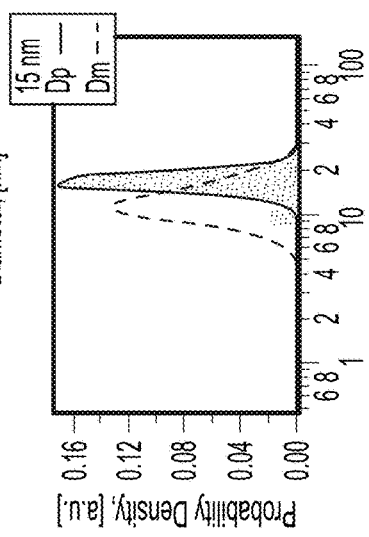
FIG. 1.9B
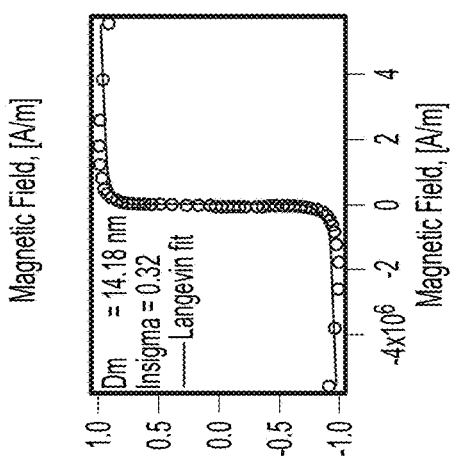
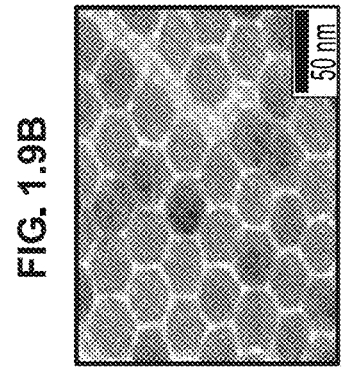
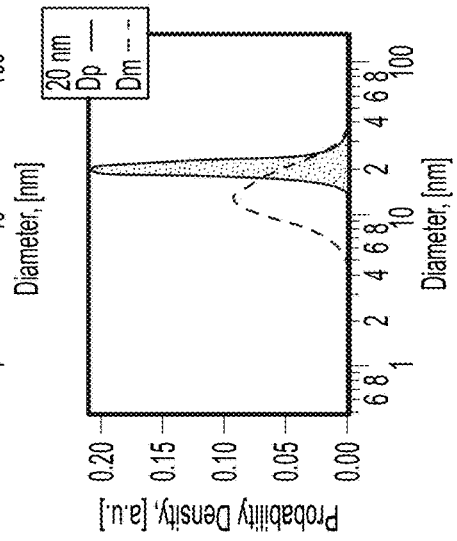
FIG. 1.9C

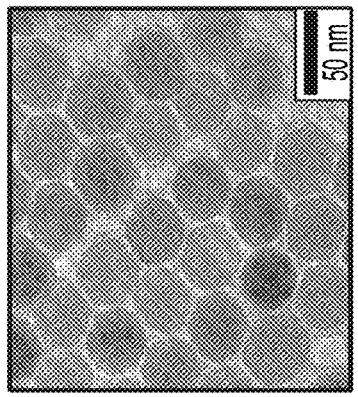
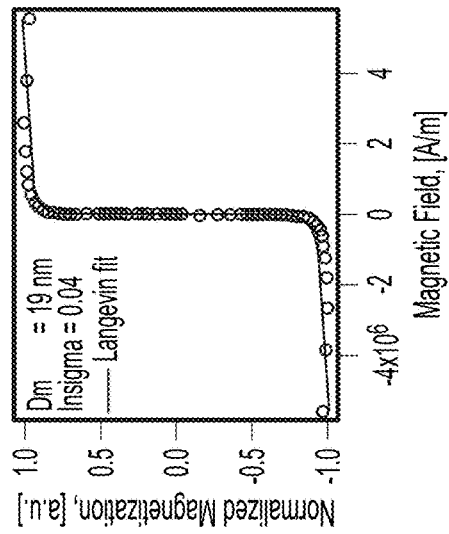
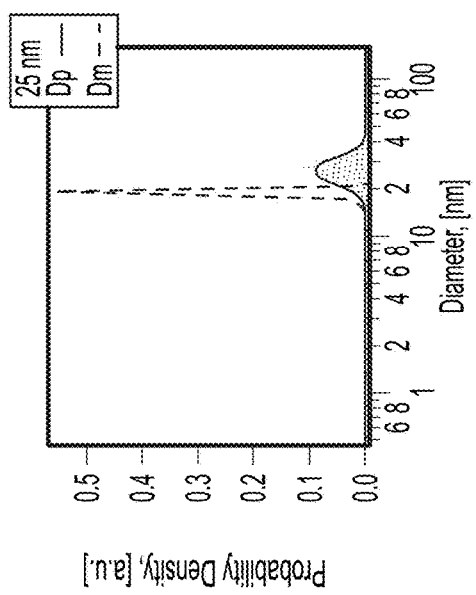
FIG. 1.9D
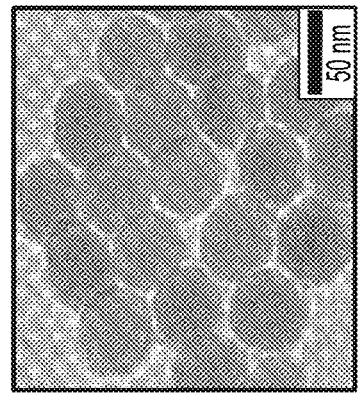
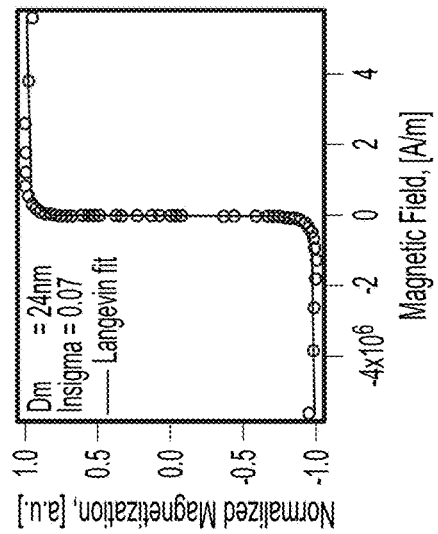
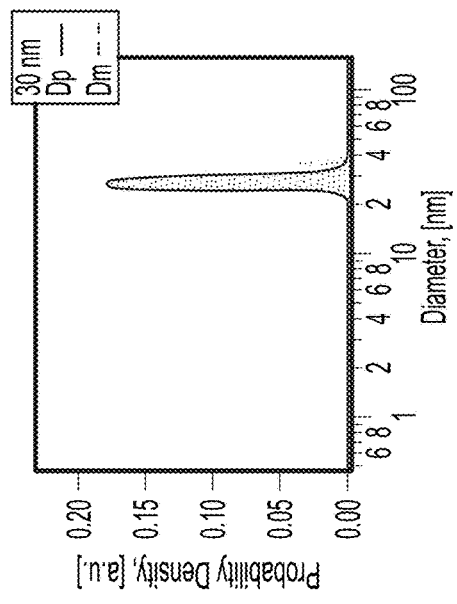
FIG. 1.9E

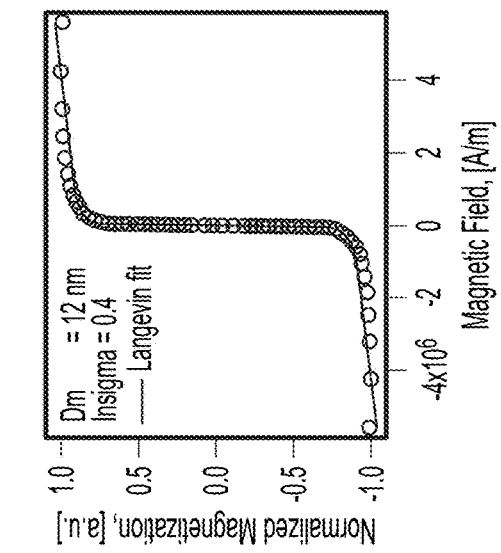
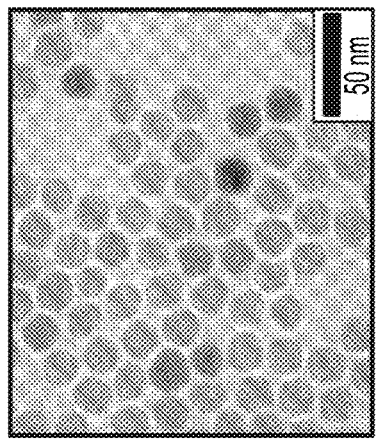
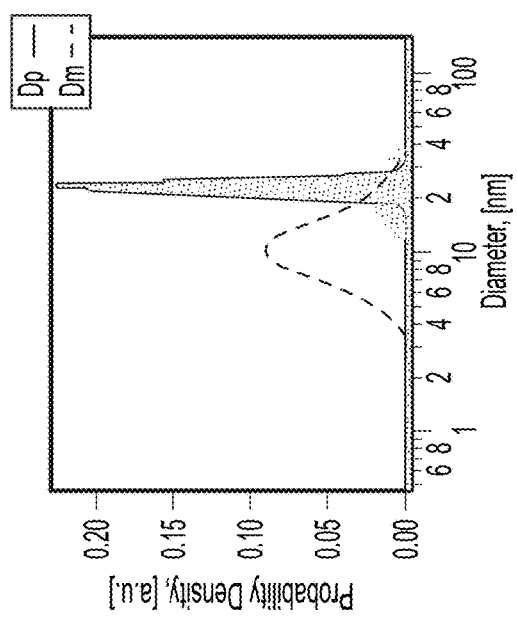
FIG. 1.10A
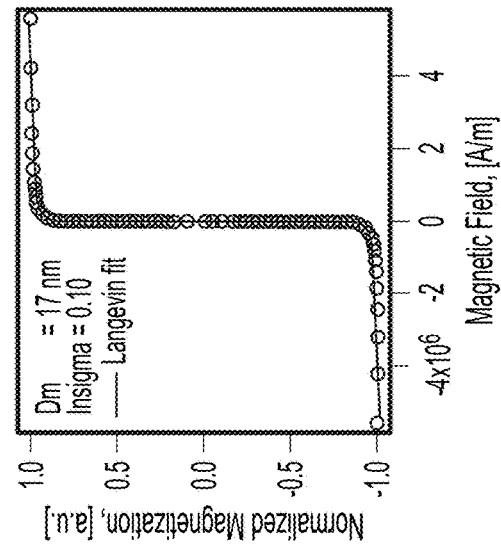
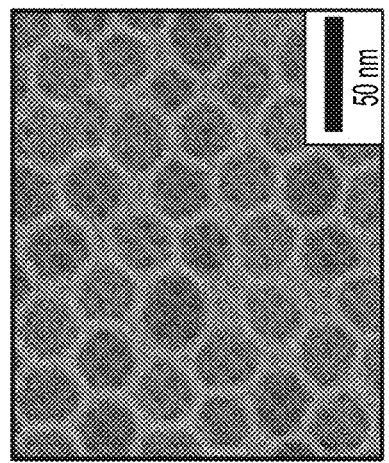
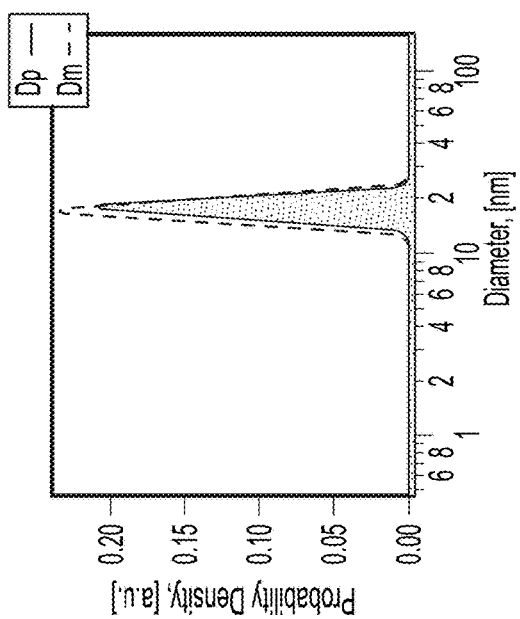
FIG. 1.10B

MAGNETIC NANOPARTICLES AND METHODS OF MAKING MAGNETIC NANOPARTICLES

CROSS-REFERENCE TO RELATED APPLICATION

This application is the 35 U.S.C. 0.371 national stage application of PCT Application No. PCT/US2017/019083, filed Feb. 23, 2017, where the PCT claims the benefit of and priority to U.S. Provisional Application Ser. No. 62/298,491, having the title "MAGNETIC NANOPARTICLES AND METHODS OF MAKING MAGNETIC NANOPARTICLES," filed on Feb. 23, 2016, both of which are herein incorporated by reference in their entireties.

BACKGROUND

Magnetic nanoparticles are an important class of materials and are attractive in a wide range of applications based on actuation of their magnetic dipoles using external fields or interaction of their magnetic dipoles with their surroundings. The performance of iron oxide nanoparticles is dependent on their magnetic properties, but these are often given cursory analysis. When magnetic properties, such as the saturation magnetization, are found to be poorer than expected, the result is often attributed to the existence of a "magnetically dead layer" on the nanoparticles. This is often the case even when the calculated thickness of the magnetically dead layer is found to be several nanometers thick, instead of the expected thickness of about one unit cell of the material. Thus, there is a need to overcome these deficiencies to achieve the full potential of magnetic nanoparticles for applications that rely on their magnetic properties.

SUMMARY

Embodiments of the present disclosure provide for magnetic nanoparticles, methods of making nanoparticles, and the like.

An embodiment of the present disclosure includes a composition, among others, that includes: magnetic nanoparticles having an arithmetic mean or a lognormal median physical diameter and an arithmetic mean or lognormal median magnetic diameter, wherein the arithmetic mean or lognormal median physical diameter is less than about 1 nm greater than the arithmetic mean or lognormal median magnetic diameter, wherein the arithmetic mean or lognormal median magnetic diameter has a size distribution with a coefficient of variation of about 1 to 12%.

An embodiment of the present disclosure includes a composition, among others, that includes: magnetic nanoparticles having an arithmetic mean or a lognormal median physical diameter and an arithmetic mean or lognormal median magnetic diameter, wherein the arithmetic mean or lognormal median physical diameter is about 15 to 40 nm, wherein the arithmetic mean or lognormal median magnetic diameter is less than about 1 nm less than the arithmetic mean or lognormal median physical diameter.

An embodiment of the present disclosure includes a method of making a nanoparticle, among others, that includes: thermally decomposing an organometallic precursor in the presence of molecular oxygen, a compound that is a source of molecular oxygen, an oxygen radical, or a combination thereof, wherein the amount of molecular oxygen, the compound that is a source of molecular oxygen, the oxygen radical, or a combination thereof is present at a stoichiometric molar ratio greater than 1 relative to the organometallic precursor; and forming the nanoparticle

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 1.1A-C show physical (red solid line) and magnetic (green dashed line) diameter distributions, representative transmission electron micrographs, and equilibrium magnetization curves for iron oxide nanoparticles obtained from two different thermal decomposition synthesis routes and commercially available nanoparticles from Ocean Nanotech, the corresponding TEM images and the Langevin fit to the equilibrium magnetization curves. FIG. 1.1A shows nanoparticles obtained from the heating-up thermal decomposition synthesis of an iron oleate precursor in trioctylamine at 350° C. FIG. 1.1B shows nanoparticles obtained by the Extended LaMer synthesis mechanism by dripping an iron oleate/1-octadecene precursor into a solvent system of oleic acid/docosane at 350° C. FIG. 1.1C shows commercial nanoparticles from Ocean Nanotech with a nominal diameter of 20 nm according to the manufacturer. Note how in all cases the magnetic diameter distributions are much smaller and much broader than the physical diameter distributions.

FIGS. 1.2A-B show the effect of adding molecular oxygen on physical and magnetic diameters for iron oxide nanoparticles obtained by the heating up thermal decomposition synthesis. For particles synthesized in the absence of oxygen the magnetic diameter distribution (dashed line) is smaller and broader than the physical diameter distribution (solid line) (FIG. 1.2A). For nanoparticles synthesized under identical conditions but with molecular oxygen added to the reactor the magnetic and physical diameters have similar distributions (FIG. 1.2B).

FIGS. 1.3A-D show controlled growth of physical but not magnetic diameter for iron oxide nanoparticles obtained using the Extended Lamer thermal decomposition synthesis in the absence of molecular oxygen for different time points of the reaction: 2 hr (FIG. 1.3A), 3 hr (FIG. 1.3B), 4 hr (FIG. 1.3C), and 5 hr (FIG. 1.3D).

FIGS. 1.4A-D show controlled growth of both physical and magnetic diameter for iron oxide nanoparticles obtained using the Extended LaMer mechanism based synthesis thermal decomposition synthesis in the presence of molecular oxygen for different time points of the reaction: 2 hr (FIG. 1.4A), 3 hr (FIG. 1.4B), 4 hr (FIG. 1.4C), and 5 hr (FIG. 1.4D).

FIG. 1.5 presents XRD powder diffractograms of iron oxide nanoparticles synthesized in the absence (w/o) and in the presence (with) of molecular oxygen ($O_2$) for both the Extended LaMer (EL) and heating up (Hp) method help understand the iron oxide phases present in the particle.

FIGS. 1.6A-B are HAADF-STEM images of iron oxide nanoparticles. Nanoparticles synthesized in the absence of oxygen (FIG. 1.6A) show polycrystalline structure comprised of many smaller crystallites, highlighted in the high magnification insets. In contrast, nanoparticles synthesized in the presence of oxygen (FIG. 1.6B) show single crystal structure throughout the particles.

FIG. 1.7 represents the ZFC (solid line)-FC (dashed line) curves of the particles synthesized in the absence (red, open circles) and presence of oxygen (green, closed circles).

FIGS. 1.8A-B show in-phase susceptibility vs temperature at different frequencies for particles synthesized without oxygen (FIG. 1.8A) and with oxygen (FIG. 1.8B).

FIGS. 1.9A-E are representative TEM images, equilibrium magnetization measurements, and corresponding physical and magnetic size distributions for commercial obtained from Ocean nanotech. The nominal diameters of 10 nm (FIG. 1.9A), 15 nm (FIG. 1.9B), 20 nm (FIG. 1.9C), 25 nm (FIG. 1.9D), 30 nm (FIG. 1.9E) correspond to the supplier's advertised size.

FIGS. 1.10A-B are representative TEM images, equilibrium magnetization measurements, and corresponding physical and magnetic diameter distributions for particles synthesized in the (FIG. 1.10A) absence and (FIG. 1.10B) presence of $O_2$ corresponding to FIGS. 1.6A-B, 1.7 and 1.8A-B.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, is to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of inorganic chemistry, materials science, nanotechnology and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of inorganic chemistry, materials science, and/or nanotechnology. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

Embodiments of the present disclosure provide for magnetic nanoparticles, methods of making nanoparticles, and the like.

Magnetic nanoparticles are an important class of ferroic materials that exhibit a spontaneous magnetization that can be controlled by an applied magnetic field. In magnetic nanoparticles, one figure of merit is the saturation magnetization, which is related to the strength of the nanoparticle's overall dipole moment, where high values can only be achieved when there is long range ordering of the atomic dipoles within the particle. Therefore, the presence of structural defects or impure phases will limit the overall performance of the nanoparticles.

Magnetic nanoparticles are attractive in a wide range of applications based on actuation of their magnetic dipoles using external fields or interaction of their magnetic dipoles with their surroundings. Interestingly, although the performance of iron oxide nanoparticles in many applications is critically dependent on their magnetic properties, these are often given cursory analysis in publications reporting methods of synthesis. Great attention is given to the physical size and shape of the nanoparticles, characterized using bright field transmission electron microscopy. Unfortunately, comparatively minimal effort is devoted to magnetic characterization. To date, an implicit assumption in the research community has been that magnetic properties scale directly with the physical diameter, as measured using transmission electron microscopy. When magnetic characterization is included in publications, it is often limited to demonstrating superparamagnetic behavior by noting the absence of coercivity/remanence and evaluating the saturation magnetization achieved at high applied magnetic fields. In other cases, the temperature dependence of magnetization is reported through so-called "zero field cooled/field cooled" magnetization as a function of temperature, which yields the blocking temperature of the nanoparticles, indicative of the temperature above which a majority of the particles become superparamagnetic. Unfortunately, even in publications that report such magnetic measurements, the data is rarely analyzed by comparing to available models and expectations. When magnetic properties, such as the saturation magnetization, are found to be poorer than expected, the result is often attributed to the existence of a "magnetically dead layer" on the surface of the nanoparticles, where spin canting and other phenomena may lead to disorder of the magnetic dipoles, and this magnetic dead layer has often been attributed to cause the reduction in magnetic performance of the nanoparticles. This is often the case even when the calculated thickness of the magnetically dead layer is found to be several nanometers thick, instead of the expected thickness of about one unit cell of the material (Kaiser & Miskolcz, 1970).

Thermal decomposition syntheses are quickly becoming the most common route to obtain magnetic nanoparticles. However, recent work has uncovered that the thermal decomposition routes may actually proceed by formation of a non-magnetic Wüstite phase and that formation of the magnetic magnetite/maghemite phases proceeds afterwards due to oxidation upon exposure to atmospheric oxygen. Furthermore, detailed high-resolution transmission electron microscopy studies suggest the presence of defects and polycrystalline particles, which may ultimately affect magnetic and functional properties of the nanoparticles. This has led to the development of post-synthesis thermal oxidative treatments to improve the magnetic properties of the nanoparticles. However, while such treatments are successful for small (<15 nm) particles, they become less effective as particle size increases (>20 nm), or require extremely long (>30 h) processing times. In contrast to known current research efforts, this and other observations led us to hypothesize that lack of oxygen in the thermal decomposition reaction medium is a major obstacle for the reproducible synthesis of oxide-based nanoparticles through thermal decomposition.

Current methods of making magnetic nanoparticles have yielded particles with distributions of magnetic diameters (determined from their equilibrium magnetic properties and comparison to models of magnetic behavior of nanoparticles) that differ significantly from their corresponding distribution of physical diameter (determined from direct observation by electron microscopy or other suitable means). This significant difference is illustrated by comparison of suitable descriptive statistics of each of the two diameter distributions, such as the arithmetic mean or the lognormal median diameter. For this purpose, use is made of the volume-weighted median physical and magnetic diameters, denoted as $D_{pgv}$ and $D_{mv}$ respectively, although other suitable statistics could alternatively be used.

An advantage of the present disclosure is that the physical diameter and the magnetic diameter of the oxide nanoparticles are similar, typically the arithmetic mean or lognormal median physical and magnetic diameters differ by less than 1 nm or less than 0.5 nm, and this can be performed without any post synthesis treatment of the magnetic oxide nanoparticles. An additional advantage includes methods of the present disclosure that can controllably adjust the dimensions of the nanoparticle while preserving this close similarity between the physical and magnetic diameter distributions. The arithmetic mean or lognormal median magnetic diameters have a narrow size distribution (e.g., the coefficient of variation is less than about 10%, or less than about 5%), unlike current synthesis methods that yield magnetic nanoparticles with low magnetic diameters and broad distributions in magnetic diameter.

In reference to diameters in embodiments of the present disclosure where a "magnetic diameter" or a "physical diameter" is referenced, it is understood that the reference is to an arithmetic mean or lognormal median magnetic diameter and/or an arithmetic mean or lognormal median physical diameter. In some instances the phrase "arithmetic mean or lognormal median" may not be present and this may be done to streamline the text as opposed to describing a different type of diameter.

Although not intending to be bound by theory, it was determined while systematically studying the kinetics of nanoparticle growth and how it affects magnetic properties of nanoparticles that the reason why post-synthesis modification does not yield particles with equal physical and magnetic diameters is likely because of formation of an oxide layer on the surface of the nanoparticle that creates a diffusion barrier preventing penetration of oxygen, slowing down oxidation with increasing particle size and resulting in undesirable oxide states. With this understanding, the introduction of molecular oxygen during their growth should minimize the effects of intra-nanoparticle diffusion and would result in the formation of the desired oxide phases, and yielding nanoparticles having similar or equal physical and magnetic diameters.

After a thorough literature review, it was found that there was little understanding on the source of oxygen that led to the formation of magnetic nanoparticles in so-called thermal decomposition methods. Previous investigations have always focused on removing molecular oxygen from high temperature synthesis due to safety concerns.

Working against this paradigm, it was determined that molecular oxygen (or a compound that is a source of molecular oxygen or an oxygen radical) can be safely added during thermal decomposition reactions. In this regard, methods of the present disclosure add molecular oxygen to the thermal decomposition reaction to controllably produce magnetic nanoparticles having physical diameter distributions and magnetic diameter distributions that are similar or equal. Having described embodiments of the present disclosure generally, additional details about various embodiments are now described.

In an embodiment, the present disclosure provides for a composition including magnetic nanoparticles having a physical diameter and a magnetic diameter. In an embodiment, the physical diameter can be up to the single domain size limit of the material that makes the magnetic nanoparticle superparamagnetic. Particles with high crystallite sizes have spins arranged in multiple domains separated by a domain wall so as to maintain the lowest energy state. In an embodiment, the composition includes single domain magnetic nanoparticles, typically found below about 100 nm, below about 95 nm, below about 90 nm, about 10 to 100 nm, about 10 to 95 nm, or about 10 to 90 nm. At such small grain sizes, formation of domain walls would be energy intensive and particles possess only a single domain.

In an embodiment, the physical diameter can be less than about 1 nm or 0.5 nm greater than the magnetic diameter. In an embodiment, the physical diameter can be about 15 to 40 nm, about 15 to 30 nm, about 15 to 25 nm, about 20 to 40 nm, about 20 to 30 nm, or about 20 to 25 nm. In an embodiment, the magnetic diameter can be less than about 1 nm or about 0.5 nm less than the physical diameter. In an embodiment, the difference between the magnetic diameter and the physical diameter is less than about 1 nm or 0.5 nm. In an embodiment, the magnetic diameter can be defined as greater than the physical diameter minus 1 nm or the physical diameter minus 0.5 nm. In an embodiment, the physical diameter and the magnetic diameter can be the same or substantially the same. In an embodiment, the magnetic diameter is similar or equal to the physical diameter and can be about 18-24 nm. In an embodiment, the magnetic diameter is similar or equal to the physical diameter and can be about 28-40 nm.

The magnetic diameter and its distribution is a measure of the strength of the magnetic dipole within each nanoparticle, and the paradigm in the field has been that the magnetic diameter will always be smaller than the physical diameter due to formation of a so-called "magnetically dead layer." The particles with size between 10-12 nm have been found to have similar magnetic and physical diameters in prior work. However, disparity between the two increases for larger particles, in the range of about 14-25 nm, about 15-25 nm about 16-24 nm, about 17-24 nm, or about 18 to 24 nm, a size range that is often sought for many biomedical applications.

Also the presence of non-magnetic oxide phases results in low magnetic volume fractions thereby increasing the size distribution of the magnetic diameter. In contrast to other methods of making oxide nanoparticles where the magnetic diameter distribution is large, the size distribution of the magnetic diameters of the present disclosure is much narrower as the formation of the right magnetic oxide phase is ensured. Details regarding the size distribution are provided in Example 1. In an embodiment, the magnetic diameter can have a size distribution of about 1 to 5% of the magnetic diameter. In an embodiment, the magnetic diameter has a size distribution with a coefficient of variation of about 4% to 12%, about 5% to 12%, about 1% to 4%, or about 1% to 3%.

In an embodiment, the magnetic nanoparticle includes iron. In an embodiment the magnetic nanoparticle can be represented by $MFe_2O_4$, where M is Fe, Co, Mn, Zn, or Ni, or their combinations. In an embodiment, the magnetic nanoparticle can be $SrFe_{12}O_{19}$ or $BaFe_{12}O_{19}$. In an embodiment, the magnetic nanoparticle can be iron oxide.

The following tables illustrate embodiments of iron oxide magnetic nanoparticles that have been produced in the absence and presence of oxygen with time.

TABLE 1.1

Particles synthesized in the absence of oxygen

| | Physical Diameter | | | Magnetic Diameter | | | |
|---|---|---|---|---|---|---|---|
| Time (hr) | Arithmetic Volume Mean (nm) | Standard Deviation (nm) | CV (%) | Arithmetic Volume Mean (nm) | Standard Deviation (nm) | CV (%) | δ (nm) |
| 2 | 18.4 | 1.1 | 5.9 | 10.1 | 5 | 49 | 4.15 |
| 3 | 21.4 | 0.6 | 2.8 | 11 | 5 | 45 | 5.2 |
| 4 | 24.6 | 1.7 | 6.9 | 13.3 | 6.3 | 47 | 5.65 |
| 5 | 26.4 | 1.3 | 4.9 | 15.7 | 5.1 | 32.4 | 5.35 |

TABLE 1.2

Particles synthesized in the presence of oxygen

| | Physical Diameter | | | Magnetic Diameter | | | |
|---|---|---|---|---|---|---|---|
| Time (hr) | Arithmetic Volume Mean (nm) | Standard Deviation (nm) | CV (%) | Arithmetic Magnetic Volume Mean (nm) | Standard Deviation (nm) | CV (%) | δ (nm) |
| 2 | 19.2 | 2.3 | 11.9 | 16.7 | 0.7 | 4.1 | 0.57 |
| 3 | 23.8 | 4.6 | 19.3 | 20 | 0.8 | 4 | 1.9 |
| 4 | 22.6 | 2.04 | 9.02 | 22 | 0.8 | 3.6 | 0.3 |
| 5 | 24.2 | 2.9 | 11.9 | 23 | 0.5 | 2.1 | 0.6 |

In an embodiment, the method of making nanoparticles of the present disclosure includes the high temperature decomposition of an organometallic precursor in the presence of molecular oxygen ($O_2$), a compound that is a source of molecular oxygen (e.g., tert-butyl hydroperoxide solution, trimethylamine N-oxide, 3-chloroperbenzoic acid or a combination thereof), an oxygen radical, or a combination thereof to form the nanoparticles. In an embodiment, the amount of molecular oxygen, the compound that is a source of molecular oxygen, the oxygen radical, or a combination thereof is present at a stoichiometric molar ratio greater than 1 relative to the organometallic precursor. In an embodiment, the molar flow rate addition of molecular oxygen, the compound that is a source of molecular oxygen, and the oxygen radical introduced with respect to the stoichiometric ratio of the metal to the oxygen to form an oxide can be about 1 to 100, about 1 to 50, about 1 to 25, about 2 to 15, about 2 to 10, or about 2 to 4. In an embodiment, molecular oxygen, the compound, or the oxygen radical can be flowed continuously or can be metered in discrete amounts at selected times for set time frames.

In an embodiment of the method, the method includes heating a mixture including an organometallic precursor, optionally, with an organic solvent and/or a surface capping agent to a temperature above the flash point of the organic solvent (e.g., about 280-350° C.) in a reaction vessel for a time frame (e.g., about 30 min to 2 hours) that depends on the size of the particle to be synthesized. In an embodiment, the temperature can be increased at a rate of about 2 to 5° C./min or about 3° C./min.

In an embodiment, the organometallic precursor can include metal oleates, metal acetylacetonates, metal cupferronates, metal carbonyls, or a combination thereof. In an embodiment, the metal oleate can include iron oleate, cobalt oleate, or other transition metal oleates.

In an embodiment, the organic solvent can be: oleic acid, trioctylamine, hexadecene, octylether, octadecene, hexadecanol, eicosene, docosane, tetracosane, Dowtherm® and Therminol® heat transfer fluids, or a combination thereof. In an embodiment, the ratio of the organometallic precursor to organic solvent can be about 1:1 to about 1:10.

In an embodiment, the surface capping agent can include oleic acid, hexadecylamine, 1-2 hexadecanediol, oleylamine, any C10-C 18 fatty acid or a combination thereof. In an embodiment, the ratio of the organometallic precursor to surface capping agent can be about 1:3 to about 1:20.

An embodiment of the method to produce nanoparticles includes heating a mixture of solvents and capping agents to above the organic solvent flash point (e.g., about 280 to 350° C.) in a reaction vessel for a time frame (e.g., about 30 min to 90 min) and further dripping a defined mixture of the organo-metallic precursor, suitable solvents, and capping agents at a certain drip rate (e.g., about 5 to 72 mL/hr) depending on the scale of the reaction. The time of reaction can depend on the size of the particle to be synthesized. In an embodiment, the organometallic precursor and the organic solvent can include those described herein at the ratios provided. In another embodiment, multiple mixtures of organo-metallic precursors can be added at controlled time points and rates in order to control the composition of the growing nanoparticles.

In all embodiments, molecular oxygen, the compound, or the oxygen radical is added to the reaction vessel as a reactant. Unlike other methods that do not add any oxygen and/or try to remove any oxygen present, embodiments of the present disclosure actively add molecular oxygen, the compound, or the oxygen radical in a stoichiometrically-defined manner where the stoichiometric molar flow rate addition of oxygen with respect to the iron present can be controlled to achieve the desired effect. As described above, stoichiometrically adding molecular oxygen produces nanoparticles having larger magnetic diameters than other methods. In an embodiment, the molecular oxygen can be added throughout the reaction. In an embodiment and for reasons of safety, the amount of molecular oxygen added to the reaction vessel must be such that the concentration of oxygen in the reactor remains below the Limiting Oxygen Concentration (LOC). In an embodiment the gas-phase concentration of oxygen is maintained below about 5% to avoid any flashing of the organic vapor phase above its flash point. Additional details are provided in Example 1.

As a result, the magnetic nanoparticles formed from the reaction are purified and magnetic nanoparticles having a physical diameter and a magnetic diameter that are similar are obtained. The concentration of the organometallic precursor, the organic solvent, the surface capping agent and the molecular oxygen, the temperature, the temperature profile, the non-reactant flow gas, the reaction time(s), and the like, can be adjusted to produce magnetic nanoparticles of desired physical and magnetic diameters.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

Here, we report the reproducible synthesis of magnetic nanoparticles with similar physical and magnetic diameter distributions, and virtually no magnetically dead layer, without the need for post-synthesis modifications, through the incorporation of molecular oxygen as a reacting species in the thermal decomposition synthesis. We show that the resulting nanoparticles consist of single crystals with few defects and possess magnetic properties consistent with those of bulk magnetite. These results demonstrate the significant improvements obtained in the properties of magnetic nanoparticles when the methods of the present invention are applied.

Assessing Magnetic Nanoparticle Quality through Magnetic Diameter Distributions

One way to assess the quality of a sample of magnetic nanoparticles is to calculate an effective magnetic diameter distribution for a given sample. This can be achieved by fitting the magnetization curve of the nanoparticles to the Langevin function $L(\alpha)$ for superparamagnetism, weighted using a lognormal size distribution (Chantrell, et al., 1978).

$$M(\alpha) = M_S \int_0^\infty n_v(D_m) L(\alpha) dD_m \quad (1)$$

$$n_v(D_m) = \frac{1}{\sqrt{2\pi} D_m \ln \sigma} \exp\left[-\frac{\ln^2(D_m/D_{mv})}{2 \ln^2 \sigma}\right] \quad (2)$$

$$L(\alpha) = \coth \alpha - \frac{1}{\alpha}; \alpha = \frac{\pi \mu_0 M_d D_m^3 H}{6 k_B T} \quad (3)$$

(2)
(3)

In equations (1)-(3), $\alpha$ is the ratio of magnetic to thermal energy (the Langevin parameter), $M_s$ is the saturation magnetization, $D_{mv}$ is the volume-weighted median magnetic diameter, $\ln \sigma$ is the geometric deviation of the magnetic diameter distribution, $\mu_0$ is the permeability of free space, $k_B$ is the Boltzmann constant, $M_d$ is the domain magnetization of the magnetic nanoparticles, and $T$ is the absolute temperature.

The possible existence of a nonmagnetic (or magnetically dead) layer on the surface of ferrite nanoparticles was suggested by Kaiser and Miskolcz (1970). Many recent studies that have compared magnetic and physical diameters have reported the magnetic diameters to be significantly smaller than the physical diameters, sometimes by several nanometers, an observation which is often attributed to the existence of a magnetically dead layer (Chen et al., 2013; Hufschmid et al., 2015; Levy et al., 2011; Gonzales-Weimuller et al., 2009; Morales et al., 1999; Luiges et al., 2011; Baaziz et al., 2014; Issa etal, 2013; van Rijssel et al.; 2015; Parkin et al., 1986; Jang et al., 2011). Post-synthesis oxidation and annealing have been shown to improve the magnetic diameter, but the in most cases a relatively thick magnetically dead layer remains, especially for larger (>20 nm) physical diameters Chen et al., 2013; Hufschmid et al., 2015; Kemp et al., 2016).

High-resolution electron microscopy suggests that iron oxide magnetic nanoparticles obtained by thermal decomposition methods may contain defects and/or may consist of multiple crystals within a single particle (Levy et al., 2011; Estrader et al., 2015; Torruella et al., 2016; Wetterskog et al., 2013). While the effect on magnetic diameter distributions of such defects and/or presence of multiple crystals has not been reported, it is reasonable to expect that they could contribute to a reduced magnetic diameter distribution relative to the physical size of the particles. In that case one can think of an effective magnetically dead layer thickness that can serve as a simple figure of merit to evaluate the particle's magnetic properties.

Results

Disparity Between Physical and Magnetic Diameter of Iron Oxide Nanoparticles Sunthesized by Thermal Decomposition in the Absence of Oxygen and in Commercial Samples Current methods of thermal decomposition synthesis of magnetic nanoparticles in the absence of oxygen yield iron oxide nanoparticles with magnetic diameters that are significantly smaller than their physical diameters. Iron oxide nanoparticles with relatively large (~20 nm) physical diameters were synthesized by two commonly-used thermal decomposition methods. Both methods consist of the thermal decomposition of an iron oleate precursor in a high boiling point solvent. Specific synthesis details are given under Methods. The resulting nanoparticles were characterized by transmission electron microscopy (TEM) and SQUID magnetometry. Physical diameter distributions were obtained from analysis of TEM images while magnetic diameter distributions were obtained from analysis of the equilibrium magnetization curves, as described under Methods.

As shown in FIGS. 1.1A-C, for both nanoparticle samples, the volume-weighted physical diameter distributions were found to be much larger than the volume-weighted magnetic diameter distributions. Particles synthesized by a heating up method (FIG. 1.1A) with nitrogen as an inert gas carrier resulted in a physical diameter $D_p$ of 18.5±1.7 nm and a much smaller magnetic diameter $D_m$ of 10.7±5.6 nm. This corresponds to a magnetically dead layer thickness of $\delta \sim 3.9$ nm. It is important to note in FIG. 1.1A that the physical size distribution is relatively narrow, with a coefficient of variation, CV, of 9%. In contrast, the magnetic size distribution is quite broad with CV=52%. Similarly, particles obtained using the Extended LaMer mechanism thermal decomposition synthesis of iron oleate at 350° C. in an argon atmosphere (FIG. 1.1B) had a physical diameter of 18.4±1.1 nm (CV=6%) and a magnetic diameter of 10.1±5 nm (CV=50%). In this case the magnetic dead layer thickness was $\delta \sim 4.1$ nm.

For comparison, samples of iron oxide nanoparticles with similar physical diameter were obtained from the commercial supplier Ocean Nanotech and subjected to the same analysis. As shown in FIG. 1.1C, commercially obtained iron oxide nanoparticles from Ocean Nanotech had a physical diameter of 21.8±1.95 nm (CV=9%) and a magnetic diameter of 14.2±4.9 nm (CV=34%, $\delta \sim 3.8$ nm). Similar disparities between physical and magnetic diameters were found for nanoparticles from Ocean Nanotech in a wide range of physical diameters (see FIGS. 1.9A-E).

Effect of Molecular Oxygen as a Reactant in the Heating Up Thermal Decomposition Synthesis FIGS. 1.2A-B provide a comparison of physical and magnetic diameters obtained for nanoparticles synthesized using identical thermal decomposition syntheses, the only difference being the absence or presence of molecular oxygen. As seen in FIG. 1.2A, nanoparticles synthesized in the absence of oxygen had a physical diameter of 18.5±1.7 nm (CV=9%) and a magnetic diameter of 10.7±5.6 nm (CV=52%, δ~3.9 nm). The controlled addition of oxygen at slight stoichiometric excess to the reaction resulted in particles with physical diameter of 15.4±1.9 nm (CV=12.3%) and magnetic diameter of 14.1±1.7 nm (CV=12%, δ~0.6 nm), as seen in FIGS. 1.2A-B. Thus, introduction of oxygen in the thermal decomposition synthesis yielded particles with similar physical and magnetic diameters and a very thin magnetically dead layer.

Controlled Growth of Physical and Magnetic Diameter through the Controlled Addition of Molecular Oxygen FIGS. 1.3A-D and 1.4A-D compare the growth in physical and magnetic diameters with time in the absence and in the presence of molecular oxygen, using argon as the inert carrier gas. For the synthesis in the absence of molecular oxygen and using argon as the inert gas (FIGS. 1.3A-D), the nanoparticles grew from 18.4±1.1 nm (CV=6%) to 26.4±1.3 nm (CV=5%) over a span of 5 hours, with corresponding magnetic diameters of 10.1±5 nm (CV=50%, δ~4.1 nm) to 15.7±5.1 nm (CV=32%, δ~5.4 nm). The fact that the thickness of the magnetically dead layer increases with time and growth of the nanoparticles indicates that the magnetic diameter is growing at a slower rate than the physical diameter. This would be consistent with our hypothesis that oxygen is a limiting reactant in the formation of the desired magnetic iron oxide phase. In contrast, when molecular oxygen was added at a controlled rate that was slightly above the stoichiometric rate required for the rate of addition of the iron oleate precursor, the physical and magnetic diameters were found to grow at similar rates. As shown in FIGS. 1.4A-D, the physical diameter increased from 13.6±2.6 nm (CV=19%) to 18.3±2.7 nm (CV=14%) while the magnetic diameter increased from 13.2±2.5 nm (CV=19%, δ~0.19 nm) to 17.1±1.7 nm (CV=10%, δ~0.59 nm). Thus, introduction of oxygen resulted in controlled growth of both physical and magnetic diameter and yielded particles with similar physical and magnetic diameters and a very thin magnetically dead layer.

Table 1.3 summarizes all the syntheses performed in the presence and absence of oxygen, showing the reproducibility in the results obtained.

Crystallite Size from X-Ray Diffraction Studies Agrees with Magnetic Diameters Obtained from Analysis of Equilibrium Magnetization Curves Powder XRD data (FIG. 1.5) showed that for syntheses in the absence of oxygen the peaks are broader than for syntheses in the presence of oxygen. One contributor to peak broadening in XRD is small crystallite size, hence this indicated that nanoparticles obtained through thermal decomposition in the absence of oxygen had smaller crystallite sizes than nanoparticles synthesized in the presence of oxygen. Because the origin of the nanoparticle's magnetic dipole is long range ferroic ordering in the crystal, we hypothesized that crystallite sizes obtained from fitting the powder XRD spectra of the nanoparticles using Scherrer's equation would correlate with the magnetic diameters determined from analysis of the equilibrium magnetization curves. Table 1.3 compares the physical $D_p$, magnetic $D_m$, and crystallite $D_{XRD}$ sizes for the nanoparticles in FIG. 1.5.

The crystallite and magnetic sizes agree for all the nanoparticles, regardless of synthesis method and whether or not oxygen was present in the reaction, all three sizes are in reasonable agreement for nanoparticles synthesized in the presence of oxygen, and the crystallite size is smaller than the physical size for nanoparticles synthesized in the absence of oxygen.

TABLE 1.3

Comparison of physical, magnetic, and crystallite sizes for iron oxide nanoparticles obtained by the heating up and Extended LaMer thermal decomposition syntheses in the absence and in the presence of oxygen.

| Method | $D_p$ (nm) | $\sigma_p$ (nm) | $D_m$ (nm) | $\sigma_m$ (nm) | $D_{XRD}$ (nm) |
|---|---|---|---|---|---|
| Extended LaMer Without O$_2$ | 26.0 | 1.3 | 15.7 | 5.1 | 15.8 |
| Extended LaMer With O$_2$ | 24.1 | 2.9 | 23.0 | 0.5 | 22.0 |
| Heating up Without O$_2$ | 18.5 | 1.7 | 10.7 | 5.6 | 10.8 |
| Heating up With O$_2$ | 15.4 | 1.9 | 14.1 | 1.7 | 14.7 |

Electron Microscopy Suggests Addition of Molecular Oxygen Yields Particles that are Single Crystalline and Possess Few Defects High-angle annular dark-field scanning transmission electron microscopy (HAADF-STEM), shown in FIGS. 1.6A-B, was used to compare particles synthesized without and with oxygen. The size distribution and conventional TEM images of the particles studied here may be found in FIGS. 1.10A-B.

FIG. 1.7 represents the ZFC (solid line)-FC (dashed line) curves of the particles synthesized in the absence (red, open circles) and presence of oxygen (green, closed circles).

FIGS. 1.8A-B show in-phase susceptibility vs temperature at different frequencies for particles synthesized without oxygen (FIG. 1.8A) and with oxygen (FIG. 1.8B).

The iron oxide nanoparticles synthesized in the absence of oxygen were found to be polycrystalline with locally defective, strained or tilted regions, shown in FIG. 1.6A. The particles synthesized in the presence of oxygen were found to be consistently single crystalline, shown in FIG. 1.6B. In combination with the XRD data, these observations imply that polycrystallinity may be a crucial factor limiting magnetic properties in oxygen-free syntheses.

Methods

Safety Considerations in the Addition of Molecular Oxygen to the Thermal Decomposition Synthesis Thermal decomposition syntheses are typically carried out at temperatures well above the flash point of the organic vapors generated by the reaction mixture. As such, these reactions are typically carried out under anaerobic conditions. Therefore, safety considerations are paramount when adding molecular oxygen to a thermal decomposition reaction. An important realization here is that the amount of oxygen needed to achieve stoichiometric ratios with respect to the iron typically used in a thermal decomposition synthesis is actually quite small, hence one can envision adding the oxygen at a low enough rate such that the risk of flashing of the organic vapors is minimized. An important concept here is that of the Limiting Oxygen Concentration (LOC), which is the minimum O$_2$ concentration in a mixture of fuel, air, and an inert gas that will propagate flame. In the absence of guidelines for the LOC in mixtures containing compositions such as the ones used in the thermal decomposition synthesis, we opted to maintain inert gas flow rates such that if no molecular oxygen was consumed in the synthesis of the nanoparticles the head space oxygen concentration would be low (Crowl, 2012). Theoretical rates of combustion of various organic solvents as a function of rate of oxygen addition were calculated to identify safe addition flow rates during synthesis (see Supporting Information, Section II). Based on the molar flow rate at which iron is added in the synthesis by Extended LaMer mechanism based synthesis, we calculated that the flow rate of a 21% oxygen in nitrogen mixture required to achieve stoichiometric ratios between iron and oxygen was 2.35 sccm (standard cubic centimeters per minute). However, we decided to use a slight excess of 4 times the stiochiometric flow rate in order to promote in-situ oxidization of the nanoparticles. Inert carrier gas was also added at a rate of 100 sccm, keeping the net oxygen concentration in the inlet gas stream well below 5%.

Synthesis of Iron Oleate Precursor for the Heating Up Thermal Decomposition Route The iron oleate precursor was prepared according to the method developed by Park et. al (2004). Briefly, 7.557 g of iron chloride hexahydate [$Fe(Cl_3).6H_2O$, ACS reagent, >97% pure from Sigma] was dissolved in 42 mL of water and reacted with 25.66 g of sodium oleate [97%, TCI America] in 98 mL hexane and 56 mL ethanol in a 500 mL 3 neck reactor. The reaction under nitrogen atmosphere was mixed using a Caframo compact overhead stirrer at 200 RPM. The reaction mixture was heated to about 60° C. using a fabric heating mantle (115 V, from GlasCol) and temperature control was ensured using a Digi-sense temperature controller (EW-89000-00, 120V, 15 A) for 4 hrs. Iron oleate formed was purified by repeated washes with deionized water and further dried of solvents using a rotary evaporator at 60° C. oil bath at 11 mbar for 30 min at 45 rpm. The oleate was aged for 15 days before being used for the thermal decomposition synthesis.

To confirm the formation of the iron (III) oleate and characterize the functional groups present, infrared spectra were collected using a Nicolet 6700 FTIR spectrometer (Thermo Scientific). The detected intensity after total internal reflection was analyzed using OMINIC software to generate a spectrum of absorbance vs wavenumber ($cm^{-1}$). The sample was scanned from 4000 to 600 $cm^{-1}$ at 4 $cm^{-1}$ resolution.

Magnetic Nanoparticle Synthesis by the Heating Up Thermal Decomposition Route in the Absence of Oxygen Iron oxide nanoparticles were synthesised by reacting 23.13 g of the iron oleate obtained using the method of Park et al. (op cit.). with 7.3 g of oleic acid in 128.21 mL of trioctylamine as the non-reacting solvent in a 500 mL three neck reactor. The reaction in the presence of nitrogen controlled by a mass flow controller (Alicat Scientific) at 100 sccm as the carrier gas was ramped up to 340° C. at 3.3° C./min under reflux. In all cases, particles obtained at the end of 1 hr were purified by hexane and acetone washes.

Synthesis of Iron Oleate Precursor for the Extended LaMer Thermal Decomposition Route A stoichiometrically defined iron oleate was prepared according to the method developed by Vreeland et.al (2015) to be used in the Extended LaMer mechanism based synthesis. Briefly, 20.02 g (56.7 mmol) of iron acetylacetonate [$Fe(acac)_3$]>98% pure, TCI America] and 80 g (283.5 mmol) of oleic acid (90% technical grade, Sigma Aldrich) were charged into a 500 mL three neck reactor flask. The reaction under 100 sccm of Argon was thoroughly mixed using a Caframo compact overhead stirrer at 350 RPM. The reaction mixture was heated to about 320° C. at a ramp rate of 8° C./min using a fabric heating mantle and temperature was controlled using a Digi-sense temperature controller. After 35 minutes at 320° C., a dark brown waxy solid was obtained and used as the precursor for the Extended LaMer mechanism based synthesis after 24 hours.

Magnetic Nanoparticle Synthesis by the Extended LaMer Thermal Decomposition Route in the Absence of Oxygen 14.015 g (48.3 mmol) of docosane (90% pure, Sigma Aldrich), was initially heated to 350° C. for 50-60 min at a ramp rate of 7-8° C./min in a 100 mL three neck reaction flask. The rate of addition of inert gas was controlled using mass flow controllers from Alicat Scientific. Once the reactor reached 350° C. the controlled addition (using a syringe pump) of 30 mL of iron oleate precursor (0.63 M Fe) mixed with 55 mL of 1-octadecene (90% technical grade, Sigma Aldrich) was initiated. Uniform mixing at 350 RPM was ensured and the reaction temperature was controlled at 350° C. for 5 hrs a using Digi-sense temperature controller. To understand the kinetics involved, aliquots of 1-2 mL were withdrawn using Pasteur pipettes at regular intervals. The reaction mixture was allowed to cool to room temperature and iron-oxide nanoparticles obtained at the end of the reaction were purified by suspending 5 mL of the black waxy liquid in 10-20 mL of hexane. The particles were precipitated using 20-40 mL of acetone by centrifuging in an Eppendorf 5430R at 7500 RPM for 10 minutes.

Magnetic Nanoparticle Synthesis by the Heating Up Thermal Decomposition Route in the Presence of Oxygen For syntheses carried out using molecular oxygen, the conditions were the same as described above for syntheses in the absence of oxygen, but oxygen feed of 20% Oxygen and 80% Ar (Airgas) was added to the reactor at a rate of 9.47 sccm, controlled using a mass flow controller (Bronkhorst USA), starting when the reaction reached 340° C. and lasting until the end of the reaction.

Magnetic Nanoparticle Synthesis by the Extended LaMer Thermal Decomposition Route in the Presence of Oxygen For syntheses carried out using molecular oxygen the conditions were the same as described above for syntheses by extended LaMer mechanism in the absence of oxygen, except that oxygen feed of 20% Oxygen and 80% Ar (Airgas) was added to the reactor at a rate of 9.47 sccm, controlled using a mass flow controller (Bronkhorst USA), simultaneously with the addition of the iron oleate precursor throughout the reaction.

Quantification of Fe in Particle Samples

10 μL of Oleic acid or PEG coated iron oxide particles suspended in toluene and water respectively were digested in 70% conc. $HNO_3$ (Optima Grade, Fisher Scientific) and left overnight at 101° C. in a heating dry block. 10 μL of digested sample was dried and iron in 46 μL in water was further reduced with 30 μL hydroxylamine hydrochloride (8.06 M) for 1 hr. 75 μL of 1,10-phenanthroline monohydrate (13 mM) was added to complex with $Fe^{2+}$, promoted using 49 μL sodium acetate (1.22 M). Absorbance of the 100 μL samples was measured at 508 nm in a SpectraMax M5 Microplate reader. The concentration of each sample run in triplicate was determined by relating to a calibration curve prepared using iron standard solutions prepared from a FLUKA Iron Standard for ICP.

Characterization of SPIONS

Physical size distributions: Physical diameters ($D_p$) of the oleic acid coated particles were obtained by imaging using a Hitachi H 7000 Transmission Electron Microscope (TEM). Images of particles sampled on an Ultrathin Carbon Type A (3-4 nm) with removable formvar grid from TedPella were acquired using a Veleta CCD side mount camera and were analyzed using ImageJ (Schneider et al., 2012).

The number median diameter ($D_{pg}$) and geometric deviation ($\ln\sigma_g$) of the particle size distribution were obtained by fitting the size distribution histograms to the lognormal distribution $$n_N(D_p) = \frac{1}{\sqrt{2\pi} D_p \ln \sigma_g} \exp\left(-\frac{\ln^2(D_p/D_{pg})}{2\ln^2 \sigma_g}\right) \quad (4)$$

The number median diameter ($D_{pg}$) was converted to a volume median diameter ($D_{pgv}$) using $$D_{pgv} = \exp(\ln D_{pg} + 3\ln^2\sigma_g) \quad (5)$$

The arithmetic volume mean diameter ($D_{pv}$) and sigma ($\sigma$) were calculated using $$D_{pv} = \exp\left(\ln D_{pgv} + \frac{\ln^2 \sigma_g}{2}\right) \quad (6)$$

$$\sigma = D_{pv}\sqrt{\exp(\ln^2 \sigma_g) - 1} \quad (7)$$

Magnetic size distributions: A Quantum Design Magnetic Property Measurement System 3 (MPMS 3) Superconducting Quantum Inference Device (SQUID) magnetometer was used to study the intrinsic properties of the oleic acid coated magnetic nanoparticles synthesized. Magnetization curves at room temperature were obtained for liquid samples in a PTFE sample holder with 100 μL of iron-oxide nanoparticles suspended in hexane/water. The volume-weighted median magnetic diameter ($D_{mv}$) and geometric deviation of the magnetic nanoparticle samples were determined by fitting the superparamagnetic equilibrium magnetization curve to the Langevin function, weighted using a lognormal size distribution $n_v(D_m)$, as commonly done in the literature (Luigjes et al., 2011, Chantrell, et al., 1978; Chen et al., 2009; Rasa, 2000). Two important assumptions are made in this analysis: the magnetic domains are spherical and the magnetic domains possess a magnetization equal to that of bulk magnetite (446,000 A/m). The corresponding equations are (1) to (3) and the volume median diameter obtained was converted to volume mean using equation (6). The saturation magnetization was deduced from the maximum of the magnetization obtained from the magnetization curves.

Crystal structure and crystallite size: X-ray powder diffractograms were collected using a Panalytical Xpert powder diffractometer with Cu-K-alpha radiation (45 kV, 40 mA) and a scintillation detector. Rietveld refinement was performed using High Score Plus on the obtained patterns and the crystallite size in each phase was estimated using Scherrer's formula. Phase was determined by matching the diffraction peaks of the sample with those in a database obtained from the International Center for Diffraction Data.

HAADF STEM: The high resolution STEM images were acquired using a NION UltraSTEM100, with lens aberrations corrected up to and including $5^{th}$ order. An operating voltage of 100 keV, a convergence angle of 30 mrad, and an inner detector angle of 80 mrad were used. Each STEM image was obtained by cross-correlating and averaging over 3-5 image acquisitions.

Blocking temperature and magnetic anisotropy: To study the blocking temperature, magnetic anisotropy constant and the interaction temperature, iron oxide nanoparticles suspended in octadecene were immobilized in polystyrene divinyl benzene (PSDVB) at 0.02 wt. % of iron wherein the particle rotation was fixed. Initial susceptibility of the particles was estimated from magnetization curves measured between 4 and 400 K at field ramp of 0.001 T/min at a low field strength of 10 Oe. A plot of the inverse of initial susceptibility and temperature was fitted to the Curie-Weiss model as given by equation (9), to obtain interaction temperature, a parameter that accounts for extent of magnetic dipole interaction in the sample.

$$\chi_0 = \frac{A}{(T - T_0)} \quad (9)$$

The anisotropy constant was determined from the dynamic response of the particle to oscillating magnetic field of 10 Oe amplitude over a range of temperatures (4 to 400 k) at different frequencies in the range of 0.1 to 1000 kHz. The Néel model ($T_0=0$) and the Volger-Fulcher model modified to account for the polydisperisty of the sample as given in equation (10) is used to interpret the temperature dependence of the Dynamic Magnetic Susceptibility measurements. From the plot of $\ln(1/\Omega)$ versus $1/T$, the slope provides an estimate of $KV_m$ and the infinite temperature intercept gives measure of $\tau_0$ $$\ln\frac{1}{\Omega} = \ln \tau_0 + \left(\frac{KV_m}{k_B(T-T_0)}\right)\exp\left(\frac{9}{2}\ln \sigma_g^2\right) \quad (10)$$

Zero Field Cooled-Field Cooled (ZFC-FC) measurements were made to evaluate the blocking temperature ($T_B$) obtained from the maximum of the ZFC curves. The magnetization of the sample was measured at a constant field of 10 Oe were in the temperature was swept at 2 K/min from 10 K to 400 K in ZFC measurements and cooled to 10 K from 400 K in the FC measurements. The anisotropy constant was found using equation (11) from the Néel relaxation model ($T_0=0$) and the Volger-Fulcher model that was modified to account for the polydispersity of the sample.

$$K = \frac{k_B(T_B - T_0)}{V_m}\ln\left(\frac{\tau_{obs}}{\tau_0}\right)\frac{1}{\exp(9/2 \ln^2 \sigma_g)} \quad (11)$$

where the characteristic time $\tau_0$ was found from the inverse frequency of the applied oscillating magnetic field vs temperature obtained from the AC susceptibility measurements and the observation time ($\tau_{obs}$) being the sweep rate by the blocking temperature.

TABLE 1.4

Arithmetic volume mean diameter and arithmetic standard deviation of the physical and the magnetic diameters of nanoparticles obtained under various inert gases in the presence and absence of oxygen for the Extended LaMer (EL) and the heating up (Hp) thermal decomposition syntheses.

| Synthesis | Inert Gas | $O_2$ source | Time (hrs) | Physical Diameter [nm] | | Magnetic Diameter [nm] | |
|---|---|---|---|---|---|---|---|
| | | | | Arithmetic Volume Mean | Arithmetic Standard Deviation | Arithmetic Volume Mean | Arithmetic Standard Deviation |
| Hp__Without Oxygen | $N_2$ | — | 1 | 18.31 | 1.10 | 10.71 | 5.58 |
| Hp__With Oxygen | $N_2$ | $N_2/O_2$ | 1 | 15.35 | 1.85 | 14.10 | 1.70 |
| EL__Without Oxygen | Ar | — | 2 | 18.43 | 1.11 | 10.05 | 5.00 |
| | | | 3 | 21.37 | 0.64 | 10.99 | 5.02 |
| | | | 4 | 24.62 | 1.73 | 13.28 | 6.29 |
| | | | 5 | 26.37 | 1.32 | 15.77 | 5.11 |
| EL__Without Oxygen | $N_2$ | — | 2 | 18.99 | 3.41 | 15.37 | 3.42 |
| | | | 3 | 20.45 | 1.64 | 17.02 | 0.78 |
| | | | 4 | 24.06 | 3.87 | 18.01 | 0.72 |
| | | | 5 | 25.46 | 3.32 | 20.02 | 0.80 |
| EL__With Oxygen | Ar | $N_2/O_2$ | 2 | 14.38 | 2.90 | 13.38 | 1.71 |
| | | | 3 | 16.58 | 3.69 | 14.50 | 1.02 |
| | | | 4 | 16.23 | 2.45 | 15.51 | 0.62 |
| | | | 5 | 17.08 | 2.23 | 16.01 | 0.64 |
| EL__with Oxygen | Ar | $Ar/O_2$ | 2 | 19.23 | 2.34 | 16.71 | 0.67 |
| | | | 3 | 23.83 | 4.57 | 20.02 | 0.80 |
| | | | 4 | 22.63 | 2.04 | 22.02 | 0.88 |
| | | | 5 | 25.76 | 4.67 | 23.00 | 0.46 |
| EL__with Oxygen* | Ar | $Ar/O_2$ | 2 | 13.62 | 2.61 | 13.24 | 2.54 |
| | | | 3 | 16.28 | 2.29 | 14.14 | 1.99 |
| | | | 4 | 17.50 | 2.82 | 16.10 | 1.78 |
| | | | 5 | 18.28 | 2.71 | 17.09 | 1.71 |

Except for *, all particles synthesized had oxygen addition from the start of precursor addition when docosane in the reactor had reached 350° C. In synthesis *, oxygen was added from the beginning of the synthesis when docosane was being heated up to 350° C.

REFERENCES

Arami, H.; Khandhar, A. P.; Tomitaka, A.; Yu, E.; Goodwill, P. W.; Conolly, S. M.; Krishnan, K. M., In vivo multimodal magnetic particle imaging (MPI) with tailored magneto/optical contrast agents. *Biomaterials* 2015, 52, 251-261.

Arami, H.; Khandhar, A. P.; Tomitaka, A.; Yu, E.; Goodwill, P. W.; Conolly, S. M.; Krishnan, K. M., In vivo multimodal magnetic particle imaging (MPI) with tailored magneto/optical contrast agents. *Biomaterials* 2015, 52, 251-261.

Baaziz, W.; Pichon, B. P.; Fleutot, S.; Liu, Y.; Lefevre, C.; Greneche, J.-M.; Toumi, M.; Mhiri, T.; Begin-Colin, S., Magnetic Iron Oxide Nanoparticles: Reproducible Tuning of the Size and Nanosized-Dependent Composition, Defects, and Spin Canting. *Journal of Physical Chemistry C* 2014, 118 (7), 3795-3810.

Baaziz, W.; Pichon, B. P.; Fleutot, S.; Liu, Y.; Lefevre, C.; Greneche, J.-M.; Toumi, M.; Mhiri, T.; Begin-Colin, S., Magnetic Iron Oxide Nanoparticles: Reproducible Tuning of the Size and Nanosized-Dependent Composition, Defects, and Spin Canting. *Journal of Physical Chemistry C* 2014, 118 (7), 3795-3810.

Barrera, C.; Herrera, A. P.; Rinaldi, C., Colloidal dispersions of monodisperse magnetite nanoparticles modified with poly(ethylene glycol). *Journal of Colloid and Interface Science* 2009, 329 (1), 107-113.

Barrera, C.; Herrera, A. P.; Rinaldi, C., Colloidal dispersions of monodisperse magnetite nanoparticles modified with poly(ethylene glycol). *Journal of Colloid and Interface Science* 2009, 329 (1), 107-113.

Bauer, L. M.; Situ, S. F.; Griswold, M. A.; Samia, A. C. S., Magnetic Particle Imaging Tracers: State-of-the-Art and Future Directions. *Journal of Physical Chemistry Letters* 2015, 6 (13), 2509-2517.

Bauer, L. M.; Situ, S. F.; Griswold, M. A.; Samia, A. C. S., Magnetic Particle Imaging Tracers: State-of-the-Art and Future Directions. *Journal of Physical Chemistry Letters* 2015, 6 (13), 2509-2517.

Biederer, S.; Knopp, T.; Sattel, T. F.; Ludtke-Buzug, K.; Gleich, B.; Weizenecker, J.; Borgert, J.; Buzug, T. M., Magnetization response spectroscopy of superparamagnetic nanoparticles for magnetic particle imaging. *Journal of Physics D-Applied Physics* 2009, 42 (20).

Birks, J. B., THE PROPERTIES OF FERROMAGNETIC COMPOUNDS AT CENTIMETRE WAVELENGTHS. *Proceedings of the Physical Society of London Section B* 1950, 63 (362), 65-74.

Casula, M. F.; Jun, Y. W.; Zaziski, D. J.; Chan, E. M.; Corrias, A.; Alivisatos, A. P., The concept of delayed nucleation in nanocrystal growth demonstrated for the case of iron oxide nanodisks. *Journal of the American Chemical Society* 2006, 128 (5), 1675-1682.

Chantrell, R. W.; Popplewell, J.; Charles, S. W., MEASUREMENTS OF PARTICLE-SIZE DISTRIBUTION PARAMETERS IN FERROFLUIDS. *Ieee Transactions on Magnetics* 1978, 14 (5), 975-977.

Chen, D. X.; Sanchez, A.; Taboada, E.; Roig, A.; Sun, N.; Gu, H. C., Size determination of superparamagnetic nanoparticles from magnetization curve. *Journal of Applied Physics* 2009, 105 (8).

Chen, R.; Christiansen, M. G.; Anikeeva, P., Maximizing Hysteretic Losses in Magnetic Ferrite Nanoparticles via Model-Driven Synthesis and Materials Optimization. *Acs Nano* 2013, 7 (10), 8990-9000.

Cornell, R. M.; Schwertmann, U., *The iron oxides: structure, properties, reactions, occurrence, and uses*. VCH: Weinheim; New York, 1996.

Crowl, D. A., Minimize the Risks of Flammable Materials. *Chemical Engineering Progress* 2012, 108 (4), 28-33.

Dhavalikar, R.; Maldonado-Camargo, L.; Garraud, N.; Rinaldi, C., Ferrohydrodynamic modeling of magnetic nanoparticle harmonic spectra for magnetic particle imaging. *Journal of Applied Physics* 2015, 118 (17).

Estrader, M.; Lopez-Ortega, A.; Golosovsky, I. V.; Estrade, S.; Roca, A. G.; Salazar-Alvarez, G.; Lopez-Conesa, L.; Tobia, D.; Winkler, E.; Ardisson, J. D.; Macedo, W. A. A.; Morphis, A.; Vasilakaki, M.; Trohidou, K. N.; Gukasov, A.; Mirebeau, I.; Makarova, O. L.; Zysler, R. D.; Peiro, F.; Baro, M. D.; Bergstrom, L.; Nogues, J., Origin of the large dispersion of magnetic properties in nanostructured oxides: FexO/Fe3O4 nanoparticles as a case study. *Nanoscale* 2015, 7 (7), 3002-3015.

Gleich, B.; Weizenecker, R., Tomographic imaging using the nonlinear response of magnetic particles. *Nature* 2005, 435 (7046), 1214-1217.

Gonzales-Weimuller, M.; Zeisberger, M.; Krishnan, K. M., Size-dependent heating rates of iron oxide nanoparticles for magnetic fluid hyperthermia. *Journal of Magnetism and Magnetic Materials* 2009, 321 (13), 1947-1950.

Goodwill, P. W.; Conolly, S. M., The X-Space Formulation of the Magnetic Particle Imaging Process: 1-D Signal, Resolution, Bandwidth, SNR, SAR, and Magnetostimulation. *Ieee Transactions on Medical Imaging* 2010, 29 (11), 1851-1859.

Goodwill, P. W.; Saritas, E. U.; Croft, L. R.; Kim, T. N.; Krishnan, K. M.; Schaffer, D. V.; Conolly, S. M., X-Space MPI: Magnetic Nanoparticles for Safe Medical Imaging. *Advanced Materials* 2012, 24 (28), 3870-3877.

Goodwill, P. W.; Tamrazian, A.; Croft, L. R.; Lu, C. D.; Johnson, E. M.; Pidaparthi, R.; Ferguson, R. M.; Khandhar, A. P.; Krishnan, K. M.; Conolly, S. M., Ferrohydrodynamic relaxometry for magnetic particle imaging. *Applied Physics Letters* 2011, 98 (26).

Hufschmid, R.; Arami, H.; Ferguson, R. M.; Gonzales, M.; Teeman, E.; Brush, L. N.; Browning, N. D.; Krishnan, K. M., Synthesis of phase-pure and monodisperse iron oxide nanoparticles by thermal decomposition. *Nanoscale* 2015, 7 (25), 11142-11154.

Iglesias, O.; Labarta, A.; Batlle, X., Exchange bias phenomenology and models of core/shell nanoparticles. *Journal of Nanoscience and Nanotechnology* 2008, 8 (6), 2761-2780.

Issa, B.; Obaidat, I. M.; Albiss, B. A.; Haik, Y., Magnetic Nanoparticles: Surface Effects and Properties Related to Biomedicine Applications. *International Journal of Molecular Sciences* 2013, 14 (11), 21266-21305.

Jang, S. Y.; You, C. Y.; Lim, S. H.; Lee, S. R., Annealing effects on the magnetic dead layer and saturation magnetization in unit structures relevant to a synthetic ferrimagnetic free structure. *Journal of Applied Physics* 2011, 109 (1), 5.

Kaiser, R.; Miskolcz.G, MAGNETIC PROPERTIES OF STABLE DISPERSIONS OF SUBDOMAIN MAGNETITE PARTICLES. *Journal of Applied Physics* 1970, 41 (3), 1064-&.

Kallumadil, M.; Tada, M.; Nakagawa, T.; Abe, M.; Southern, P.; Pankhurst, Q. A., Suitability of commercial colloids for magnetic hyperthermia. *Journal of Magnetism and Magnetic Materials* 2009, 321 (10), 1509-1513.

Kemp, S. J.; Ferguson, R. M.; Khandhar, A. P.; Krishnan, K. M., Monodisperse magnetite nanoparticles with nearly ideal saturation magnetization. *RSC Advances:* 2016; Vol. 6, pp 77452-77464.

Khandhar, A. P.; Ferguson, R. M.; Arami, H.; Kemp, S. J.; Krishnan, K. M., Tuning Surface Coatings of Optimized Magnetite Nanoparticle Tracers for In Vivo Magnetic Particle Imaging. *Ieee Transactions on Magnetics* 2015, 51 (2).

Levy, M.; Quarta, A.; Espinosa, A.; Figuerola, A.; Wilhelm, C.; Garcia-Hernandez, M.; Genovese, A.; Falqui, A.; Alloyeau, D.; Buonsanti, R.; Davide Cozzoli, P.; Angel Garcia, M.; Gazeau, F.; Pellegrino, T., Correlating Magneto-Structural Properties to Hyperthermia Performance of Highly Monodisperse Iron Oxide Nanoparticles Prepared by a Seeded-Growth Route. *Chemistry of Materials* 2011, 23 (18), 4170-4180.

Luigjes, B.; Woudenberg, S. M.; de Groot, R.; Meeldijk, J. D.; Galvis, H. M. T.; de Jong, K. P.; Philipse, A. P.; Erne, B. H., Diverging Geometric and Magnetic Size Distributions of Iron Oxide Nanocrystals. *Journal of Physical Chemistry C* 2011, 115 (30), 14598-14605.

Manh-Huong Phan; Javier Alonso; Khurshid, H.; Lampen-Kelley, P.; Chandra, S.; Repa, K. S.; Nemati, Z.; Das, $^R$; Iglesias, O.; Srikanth, H., Exchange Bias Effects in Iron Oxide-Based Nanoparticle Systems. Functional Magnetic Nanoparticles in Nanomedicine): *Nanomaterials* 6 (11), 221; doi: 10.3390/nano6110221, 2016; Vol. 6, p 221.

Merida, F.; Chiu-Lam, A.; Bohorquez, A.; Maldonado-Camargo, L.; Perez, M. E.; Pericchi, L.; Torres-Lugo, M.; Rinaldi, C., Optimization of synthesis and peptization steps to obtain iron oxide nanoparticles with high energy dissipation rates. *Journal of Magnetism and Magnetic Materials* 2015, 394, 361-371.

Morales, M. P.; Veintemillas-Verdaguer, S.; Montero, M. I.; Serna, C. J.; Roig, A.; Casas, L.; Martinez, B.; Sandiumenge, F., Surface and internal spin canting in gamma-Fe2O3 nanoparticles. *Chemistry of Materials* 1999, 11 (11), 3058-3064.

Muscas, G.; Singh, G.; Glomm, W. R.; Mathieu, R.; Kumar, P. A.; Concas, G.; Agostinelli, E.; Peddis, D., Tuning the Size and Shape of Oxide Nanoparticles by Controlling Oxygen Content in the Reaction Environment: Morphological Analysis by Aspect Maps. *Chemistry of Materials* 2015, 27 (6), 1982-1990.

Na, H. B.; Song, I. C.; Hyeon, T., Inorganic Nanoparticles for MRI Contrast Agents. *Advanced Materials* 2009, 21 (21), 2133-2148.

Panagiotopoulos, N.; Duschka, R. L.; Ahlborg, M.; Bringout, G.; Debbeler, C.; Graeser, M.; Kaethner, C.; Ludtke-Buzug, K.; Medimagh, H.; Stelzner, J.; Buzug, T. M.; Barkhausen, J.; Vogt, F. M.; Haegele, J., Magnetic particle imaging: current developments and future directions. *International Journal of Nanomedicine* 2015, 10.

Park, J.; An, K. J.; Hwang, Y. S.; Park, J. G.; Noh, H. J.; Kim, J. Y.; Park, J. H.; Hwang, N. M.; Hyeon, T., Ultra-large-scale syntheses of monodisperse nanocrystals. *Nature Materials* 2004, 3 (12), 891-895.

Parkin, S. S. P.; Sigsbee, R.; Felici, R.; Felcher, G. P., OBSERVATION OF MAGNETIC DEAD LAYERS AT THE SURFACE OF IRON-OXIDE FILMS. *Applied Physics Letters* 1986, 48 (9), 604-606.

Rasa, M., Magnetic properties and magneto-birefringence of magnetic fluids. *European Physical Journal E* 2000, 2 (3), 265-275.

Rosensweig, R. E., Heating magnetic fluid with alternating magnetic field. *Journal of Magnetism and Magnetic Materials* 2002, 252 (1-3), 370-374.

Schneider, C. A.; Rasband, W. S.; Eliceiri, K. W., NIH Image to ImageJ: 25 years of image analysis. *Nature Methods* 2012, 9 (7), 671-675.

Torruella, P.; Arenal, R.; de la Pena, F.; Saghi, Z.; Yedra, L.; Eljarrat, A.; Lopez-Conesa, L.; Estrader, M.; Lopez-Ortega, A.; Salazar-Alvarez, G.; Nogues, J.; Ducati, C.; Midgley, P. A.; Peiro, F.; Estrade, S., 3D Visualization of the Iron Oxidation State in FeO/Fe3O4 Core-Shell Nanocubes from Electron Energy Loss Tomography. *Nano Letters* 2016, 16 (8), 5068-5073.

van Rijssel, J.; Kuipers, B. W. M.; Erne, B. H., Bimodal distribution of the magnetic dipole moment in nanoparticles with a monomodal distribution of the physical size. *Journal of Magnetism and Magnetic Materials* 2015, 380, 325-329.

Vreeland, E. C.; Watt, J.; Schober, G. B.; Hance, B. G.; Austin, M. J.; Price, A. D.; Fellows, B. D.; Monson, T. C.; Hudak, N. S.; Maldonado-Camargo, L.; Bohorquez, A. C.; Rinaldi, C.; Huber, D. L., Enhanced Nanoparticle Size Control by Extending LaMer's Mechanism. *Chemistry of Materials* 2015, 27 (17), 6059-6066.

Wetterskog, E.; Tai, C. W.; Grins, J.; Bergstrom, L.; Salazar-Alvarez, G., Anomalous Magnetic Properties of Nanoparticles Arising from Defect Structures: Topotaxial Oxidation of Fe1-xO vertical bar Fe3-delta O4 Core vertical bar Shell Nanocubes to Single-Phase Particles. *Acs Nano* 2013, 7 (8), 7132-7144.

Wildeboer, R. R.; Southern, P.; Pankhurst, Q. A., On the reliable measurement of specific absorption rates and intrinsic loss parameters in magnetic hyperthermia materials. *Journal of Physics D-Applied Physics* 2014, 47 (49).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A composition, comprising:
magnetic nanoparticles having an arithmetic mean or a lognormal median physical diameter and an arithmetic mean or lognormal median magnetic diameter, wherein the arithmetic mean or lognormal median physical diameter is less than about 1 nm greater than the arithmetic mean or lognormal median magnetic diameter, wherein the arithmetic mean or lognormal median magnetic diameter has a size distribution with a coefficient of variation of about 1 to 12%, wherein the magnetic nanoparticle is $SrFe_{12}O_{19}$ or $BaFe_{12}O_{19}$.

2. The composition of claim 1, wherein the arithmetic mean or lognormal median physical diameter is about 15 to 40 nm.

3. The composition of claim 2, wherein the arithmetic mean or lognormal median magnetic diameter is about the same as to the arithmetic mean or lognormal median physical diameter minus 1 nm.

4. The composition of claim 1, wherein the difference between the arithmetic mean or lognormal median physical diameter and the arithmetic mean or lognormal median magnetic diameter is less than 1 nm.

5. The composition of claim 1, wherein the difference between the arithmetic mean or lognormal median physical diameter and the arithmetic mean or lognormal median magnetic diameter is less than 0.5 nm.

6. The composition of claim 1, wherein the physical diameter is up to the single domain size limit of a material that makes up the magnetic nanoparticle.

7. The composition of claim 6, wherein the magnetic nanoparticles are single crystalline structures.

8. A composition, comprising:
magnetic nanoparticles having an arithmetic mean or a lognormal median physical diameter and an arithmetic mean or lognormal median magnetic diameter, wherein the arithmetic mean or lognormal median physical diameter is 15 to 40 nm, wherein the arithmetic mean or lognormal median magnetic diameter is less than 1 nm less than the arithmetic mean or lognormal median physical diameter, wherein the magnetic nanoparticle is $MFe_2O_4$, wherein M is Co, Zn, or Ni, or their combinations.

9. The composition of claim 8, wherein the arithmetic mean or lognormal median physical diameter is 20-30 nm.

10. The composition of claim 8, wherein the arithmetic mean or lognormal median magnetic diameter has a size distribution with a coefficient of variation of 1 to 12%.

11. A composition, comprising:
magnetic nanoparticles having an arithmetic mean or a lognormal median physical diameter and an arithmetic mean or lognormal median magnetic diameter, wherein the arithmetic mean or lognormal median physical diameter is less than 1 nm greater than the arithmetic mean or lognormal median magnetic diameter, wherein the arithmetic mean or lognormal median magnetic diameter has a size distribution with a coefficient of variation of 1 to 12%, wherein the magnetic nanoparticle is $MFe_2O_4$, wherein M is Co, Zn, or Ni, or their combinations, wherein the arithmetic mean or lognormal median physical diameter is 15 to 40 nm.

12. The composition of claim 11, wherein the arithmetic mean or lognormal median magnetic diameter is about the same as to the arithmetic mean or lognormal median physical diameter minus 1 nm.

13. The composition of claim 11, wherein the difference between the arithmetic mean or lognormal median physical diameter and the arithmetic mean or lognormal median magnetic diameter is less than 1 nm.

14. The composition of claim 11, wherein the difference between the arithmetic mean or lognormal median physical diameter and the arithmetic mean or lognormal median magnetic diameter is less than 0.5 nm.

15. The composition of claim 11, wherein the physical diameter is up to the single domain size limit of a material that makes up the magnetic nanoparticle.

16. The composition of claim 11, wherein the magnetic nanoparticles are single crystalline structures.

17. The composition of claim 8, wherein the magnetic nanoparticle is $MFe_2O_4$, wherein M is Zn, or Ni, or their combinations.

18. The composition of claim 11, wherein the magnetic nanoparticle is $MFe_2O_4$, wherein M is Zn, or Ni, or their combinations.

* * * * *